United States Patent Office 2,703,324
Patented Mar. 1, 1955

2,703,324

BASIC ETHERS OF ARALKYL PHENOLS AND SALTS THEREOF

Stephen B. Binkley, Elmhurst, Ill., and Lee C. Cheney, Fayetteville, N. Y., assignors to Bristol Laboratories Inc., Syracuse, N. Y., a corporation of New York No Drawing. Application August 30, 1950, Serial No. 182,412

9 Claims. (Cl. 260—309.6)

This application is a continuation-in-part of our co-pending applications Serial No. 760,694, filed July 12, 1947, now abandoned, Serial No. 37,304, filed July 6, 1948, now abandoned, and Serial No. 128,028, filed November 17, 1949, now abandoned.

This invention relates to new basic ethers of aralkyl phenols having the general formula:

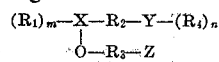

wherein X designates a member of the group consisting of benzene, naphthalene, and quinoline; $R_1$ and $R_4$ are members of the group consisting of hydrogen, alkyl, hydroxy, cyclohexyl, alkoxy, amino, dialkylamino, nitro, halogen and cycloalkyl; $m$ and $n$ are integers from 1 to 4; $R_2$ is a member of the class consisting of alkylene, substituted alkylene, and unsaturated alkylene; $R_3$ represents a straight or branched alkylene chain containing from 1 to 6 carbon atoms, inclusive; Z designates a member of the class consisting of alkylamino, cycloalkylamino, dialkylamino, 1-pyrrolidyl, 1-piperidyl, 4-morpholinyl, 1-(2-methylpiperidyl), thiomorpholinyl, substituted piperazinyl and the following radicals:

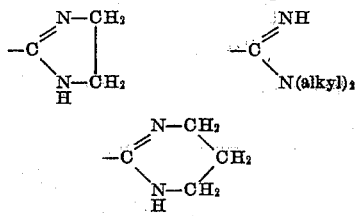

and Y designates a member of the group consisting of benzene, pyridine, thiophene, and furan.

This invention also includes the acid addition salts of these basic ethers, the quaternary salts, the processes for making the ether compounds, new processes for making novel phenolic compounds which are used as intermediates, and a special one-step process for the preparation of the dihydrogen citrates of the basic ethers.

Examples of the acid addition salts of the basic ethers with inorganic or organic acids which may be prepared by the methods hereinafter disclosed are the hydrochloride, hydrobromide, hydroiodide, sulfate, phosphate, maleate, acetate, citrate, oxalate, succinate, benzoate, tartarate, phthalate, picrate, fumarate, 8-chlorotheophyllinate and the like.

The compounds of this invention are useful as pharmaceuticals and as pharmaceutical intermediates. More specifically, compounds of this invention have been found to possess local anesthetic and antihistaminic activity, and are also useful as antifungal agents.

The compounds of the invention are potent antihistamine agents are revealed by their ability to alleviate the severe bronchioconstriction in guinea pigs induced by histamine administration. The compounds are extremely active in preventing anaphylactic shock in sensitized guinea pigs. In vitro experiments with guinea pig ileal muscle suspended in Tyrodis solution, prove that these compounds are remarkably active in preventing smooth muscle spasm induced by such agents as histamine or acetyl-choline chloride.

The compounds may be administered to humans as the hydrochloride or other salts or the free bases. They may be given orally, parenterally, rectally, or as a vapor or mist. The more active compounds of the invention are indicated for therapeutic use in humans for allergic conditions (asthma, urticaria, histamine cephalgia, anaphylactic shock), and in smooth muscle spasm (biliary spasm, dysmenorrhea).

The compounds of this invention are prepared by reacting a secondary or tertiary amino alkyl halide with a metal salt, preferably an alkali metal salt of an aralkylphenol. Alternatively, the compounds may be prepared by reacting a primary or secondary amine with an aralkylphenoxyalkyl halide. Also, an alkyl aralkylphenoxyacetate may be caused to react with a 1,2-diamine or a 1,3-diamine to give an aralkylphenoxymethylimidazoline or an aralkylphenoxymethyltetrahydropyrimidine.

The quaternary salts of this invention may be prepared by causing substituted aralkylphenoxyalkyl amines to react with alkyl halides, aralkyl halides, alkyl sulfates or alkyl p-toluenesulfonates. Alternatively, the quaternary salts may be prepared by causing an aralkylphenoxyalkyl halide to react with a tertiary amine.

The salts, such as the citrates of the aforementioned basic ethers, may be made by reacting the metal salt of the aralkylphenol with an aminoalkyl halide, following which an aqueous solution of the acid to be used, for example, citric acid, is added to the reaction mixture. The resulting mixture is then cooled and the precipitated salt is collected by filtration. The advantage of this process is that isolation of the intermediate basic ether is not necessary, thus allowing a saving of equipment, time and chemicals.

The following examples are given to illustrate the scope of this invention without limiting it thereto.

All temperatures mentioned in each of the following examples are expressed in terms of the centigrade scale.

EXAMPLE 1

*4-ethoxy-2-benzylphenol*

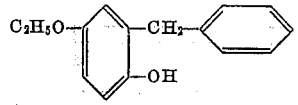

A solution of 138 grams of 4-ethoxyphenol in 200 cc. of toluene is added dropwise to a stirred suspension of 24 grams of sodium hydride in 200 cc. of toluene. A vigorous evolution of hydrogen occurs, accompanied by the generation of heat. At the end of the addition, a light green suspension of the sodium phenolate is present. To this suspension, which still contains some unreacted sodium hydride, are now added dropwise 140 grams of benzyl chloride. No heat effect is observed during the addition, but when the mixture is heated to boiling, an evolution of heat is noticed. The reaction mixture is refluxed, with stirring, for five hours, then cooled and hydrolyzed with ice and hydrochloric acid. The toluene layer is separated, washed with water, then washed with saturated sodium bicarbonate solution, then extracted several times with Claisen's alkali. Acidification of the alkaline solution with hydrochloric acid liberates the phenolic product, which is removed by extraction with ether. The combined ether extracts are dried, the solvent evaporated and the residue distilled in vacuo. There is obtained a forerun of recovered 4-ethoxyphenol, followed by 95.8 grams of 2-benzyl-4-ethoxyphenol, B. P. 165–167°/0.5 mm.

Analysis:

|   | Calcd. for $C_{15}H_{16}O_2$ | Found |
|---|---|---|
| C | 78.9 | 79.1 |
| H | 7.1 | 7.3 |

An alternate method for working up the product gives equally good results. The toluene solution obtained on hydrolysis is evaporated to dryness, and the residue dissolved in approximately four times its volume of Claisen's alkali. After repeated extraction with petroleum ether to remove the neutral material, the alkaline solution is acidified and worked up as described above.

In a manner similar to that described above, a number of other substituted phenols are prepared. These examples are summarized below:

EXAMPLE 2

*4-methoxy-2-benzylphenol*

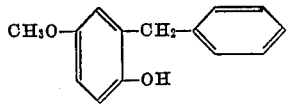

B. P. 198°/7 mm.–212°/12 mm., M. P. 103.5–104.5°.
Analysis:

|   | Calcd. for $C_{14}H_{14}O_2$ | Found |
|---|---|---|
| C | 78.5 | 78.5 |
| H | 6.6 | 6.4 |

EXAMPLE 3

*4-cyclohexyl-2-benzylphenol*

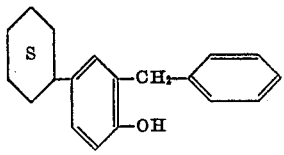

B. P. 188–196°/2 mm., M. P. 87.5–89.0°.
Analysis:

|   | Calcd. for $C_{19}H_{22}O$ | Found |
|---|---|---|
| C | 85.7 | 85.7 |
| H | 8.3 | 8.2 |

EXAMPLE 4

*4-tertiary butyl-2-benzylphenol*

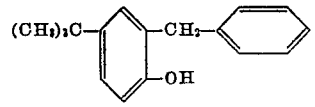

B. P. 151°/1.5 mm.–162°/2.5 mm.
Analysis:

|   | Calcd. for $C_{17}H_{20}O$ | Found |
|---|---|---|
| C | 84.9 | 85.0 |
| H | 8.4 | 8.8 |

M. P. 125.5–127.0°.

EXAMPLE 5

*2-(alpha-methylbenzyl)phenol*

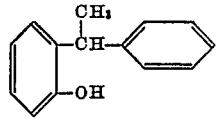

B. P. 122–126°/1.5 mm.
Analysis:

|   | Calcd. for $C_{14}H_{14}O$ | Found |
|---|---|---|
| C | 84.8 | 84.8 |
| H | 7.1 | 7.5 |

EXAMPLE 6

*2-(4'-isopropylbenzyl)phenol*

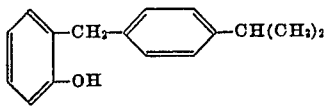

B. P. 134–137°/1 mm.
Analysis:

|   | Calcd. for $C_{16}H_{18}O$ | Found |
|---|---|---|
| C | 84.9 | 84.6 |
| H | 8.0 | 7.9 |

EXAMPLE 7

*2-(2',3'-dimethoxybenzyl)phenol*

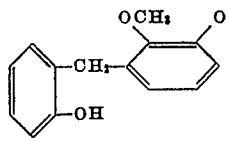

B. P. 148–154°/1 mm., M. P. 125.5–127.0°.
Analysis:

|   | Calcd. for $C_{15}H_{16}O_3$ | Found |
|---|---|---|
| C | 73.8 | 73.8 |
| H | 6.6 | 6.8 |

EXAMPLE 8

*2-(4'-methoxybenzyl)phenol*

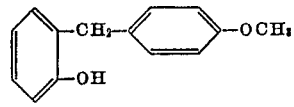

B. P. 154–157°/1 mm., M. P. 80.0–81.5°.
Analysis:

|   | Calcd. for $C_{13}H_{14}O_2$ | Found |
|---|---|---|
| C | 78.5 | 78.3 |
| H | 6.6 | 6.6 |

EXAMPLE 9

*2-(2',4'-dichlorobenzyl)phenol*

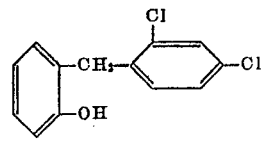

B. P. 142–147°/1 mm.
Analysis:

|   | Calcd. for $C_{13}H_{10}OCl_2$ | Found |
|---|---|---|
| C | 61.7 | 61.8 |
| H | 4.0 | 4.0 |

EXAMPLE 10

*2-(5'-chloro-2'-thenyl)phenol*

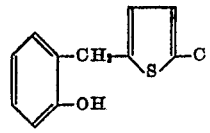

B. P. 135–139°/1 mm.

Analysis:

|   | Calcd. for $C_{11}H_9OCIS$ | Found |
|---|---|---|
| C | 58.8 | 58.5 |
| H | 4.0 | 4.2 |

EXAMPLE 11

*2-(4'-fluorobenzyl)phenol*

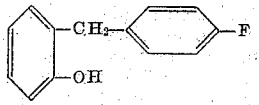

A solution of 132 grams (1.41 moles) of phenol in 50 ml. of toluene is added slowly to a stirred suspension of 33.8 grams (1.41 moles) of sodium hydride in 750 ml. of toluene. To the resulting suspension of sodium phenoxide, stirred and maintained at gentle reflux, is added dropwise 205 grams (1.41 moles) of 4-fluorobenzylchloride. The reaction mixture is refluxed for 12 hours. Following hydrolysis with dilute hydrochloric acid, the toluene is removed by steam distillation. The residual oil is separated from the water, taken up in Skellysolve D and shaken with 300 ml. of Claisen's alkali. Acidification of the aqueous layer liberates the phenolic material, which is extracted into ether. Distillation of the ether extracts gives 117 grams (41% yield) of 2-(4'-fluorobenzyl)phenol.

Analysis:

|   | Calcd. for $C_{13}H_{11}OF$ | Found |
|---|---|---|
| C | 77.2 | 76.5 |
| H | 5.5 | 5.5 |

EXAMPLE 12

*4-fluoro-2-benzylphenol*

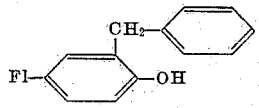

In the manner described in (11), sodium 4-fluorophenoxide is caused to react with benzyl chloride to give 4-fluoro-2-benzylphenol, B. P. 117–123°/1 mm. (41% yield).

Analysis:

|   | Calcd. for $C_{13}H_{11}OF$ | Found |
|---|---|---|
| C | 77.2 | 75.7 |
| H | 5.5 | 5.5 |

EXAMPLE 13

*4-iodo-2-benzylphenol*

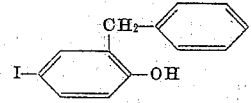

In the manner described in (11), sodium 4-iodophenoxide is caused to react with benzyl chloride to give 4-iodo-2-benzylphenol, B. P. 163–167°/1 mm. (44% yield).

EXAMPLE 14

*4-dimethylamino-2-benzylphenol*

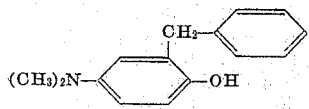

One hundred grams (0.268 mole) of 4-dimethylaminophenol sulfate is shaken with 500 ml. of saturated sodium bicarbonate and 200 ml. of chloroform until complete solution is attained. The chloroform layer is drawn off and the aqueous layer extracted twice with fresh chloroform. The combined extracts are dried, an equal volume of toluene added, and the chloroform distilled off. The resulting toluene solution of 4-dimethylaminophenol is added gradually to a suspension of 12 grams (0.5 mole) of sodium hydride in 300 ml. of toluene. After one hour's reflux, 62 grams (0.5 mole) of benzyl chloride is added dropwise to the suspension of sodium 4-dimethylaminophenoxide. The reaction mixture is refluxed for 1.5 hours, then hydrolyzed with water. The toluene layer is filtered, dried, stripped and distilled in vacuo. The entire distillate boiling between 120 and 210° at 2–3 mm. is retained (69 grams). The distillate is taken up in 200 ml. of Claisens' alkali and extracted twice with Skellysolve D. Hydrochloric acid is added to the aqueous layer until the pH falls to 8; the mixture is then extracted thoroughly with ether. The ether extracts are combined, dried, stripped and the residual oil distilled to give 16.4 grams of 4-dimethylamino-2-benzylphenol, B. P. 165–180°/1 mm., $n_D^{25}$ 1.6030.

EXAMPLE 15

*2-(3'-thenyl)phenol*

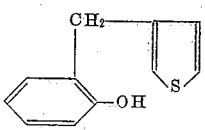

In the manner described in (11), sodium phenoxide is caused to react with 3-thenyl bromide to give 2-(3'-thenyl)phenol, B. P. 124–130°/1 mm.

EXAMPLE 16

*2-(2'-furfuryl)phenol*

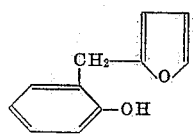

In the manner described in (11), sodium phenoxide is caused to react with 2-furfuryl bromide to give 2-(2'-furfuryl)phenol.

EXAMPLE 17

*7-benzyl-8-hydroxyquinoline*

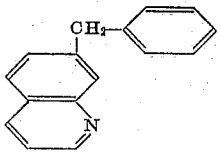

A solution of 100 grams (0.69 mole) of 8-hydroxyquinoline in 250 ml. of toluene is added slowly to a stirred suspension of 16.5 grams (0.69 mole) of sodium hydride in 750 ml. of toluene. The reaction mixture is refluxed for thirty minutes, and then 78 grams (0.69 mole) of benzyl chloride is added dropwise over a period of five hours. After refluxing overnight, the reaction mixture is hydrolyzed with dilute hydrochloric acid. Sodium bicarbonate is added until the pH rises to 8. The toluene layer is then removed and the solvent stripped under reduced pressure. The residue is taken up in 400 ml. of Claisen's alkali and extracted twice with Skellysolve D. Careful adjustment of the pH of the aqueous layer to 7 with hydrochloric acid causes a semi-solid material to separate, which is extracted with ether containing a little chloroform. The extracts are combined, dried and stripped. Distillation of the residue gives 93 grams (58% yield) of 7-benzyl-8-hydroxyquinoline, B. P. 193–205°/3 mm. The product melts at 96.5–97.5° after recrystallization from cyclohexane.

Analysis:

|   | Calcd. for $C_{16}H_{13}ON$ | Found |
|---|---|---|
| C | 81.7 | 81.7 |
| H | 5.6 | 5.6 |

EXAMPLE 18

*2-(2-pyridylmethyl)phenol*

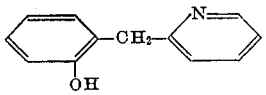

To a stirred suspension of 55.8 grams (1.47 moles) of lithium hydride in 1.3 liters of dry ether is added dropwise a solution of 201 grams (1.48 moles) of 2-methoxybenzaldehyde (prepared from salicylaldehyde according to the method given in "Organic Syntheses," Col. vol. II, p. 619) in 800 ml. of dry ether. After fifteen hours' stirring at room temperature, the reaction mixture is cautiously hydrolyzed with dilute sulfuric acid, having first decomposed the excess lithium aluminum hydride with absolute alcohol. The ether layer is removed, dried and stripped. Distillation gives 181 grams (88% yield) of 2-methoxybenzyl alcohol, B. P. 101–103°/3 mm.

A solution of 179 grams (1.29 moles) of 2-methoxybenzyl alcohol in 300 ml. of dry ether is saturated with dry hydrogen chloride at 0°. After standing overnight at 5°, the ether is evaporated in a current of air; the residual oil washed twice with water, once with saturated sodium bicarbonate and again with water. This oil is dissolved in 300 ml. of alcohol and added to a solution of 80.5 grams (1.64 moles) of sodium cyanide in 125 ml. of water over a period of 40 minutes. The reaction mixture is allowed to stand at room temperature for 30 minutes, then refluxed for four hours. The cooled mixture is filtered, and as much alcohol as possible evaporated on the steam bath. The remaining material is extracted thoroughly with ether; the ether extracts dried, stripped and distilled to give 2-methoxyphenylacetonitrile, B. P. 125–135°/9 mm. The product solidifies, and on recrystallization from cyclohexane gives 82.8 grams of nitrile melting at 69.0–70.5° (44% yield).

To a stirred suspension of 21.9 grams (0.56 mole) of sodium amide in 500 ml. of toluene, under a nitrogen atmosphere, is added a solution of the aforementioned 2-methoxyphenylacetonitrile in toluene over a period of 30 minutes. After stirring for 30 minutes more, a solution of 68 grams (0.6 mole) of 2-chloropyridine in 200 ml. of toluene is added dropwise thereto. The reaction mixture is gradually heated to reflux and maintained there for three hours. Hydrolysis is effected by the careful addition of 50 ml. of alcohol, followed by 250 ml. of water. The toluene is removed by steam distillation. The supernatant oil is removed from the residue and distilled twice; there is obtained 19.0 grams of alpha-(2'-pyridyl)-2-methoxyphenylacetonitrile, B. P. 154–157°/<1 mm., M. P. 67.6–71.5°.

A solution of 19.0 grams (0.29 mole) of potassium hydroxide and the above alpha-(2'-pyridyl)-2-methoxyphenylacetonitrile in triethylene glycol is refluxed for 14 hours, cooled and poured into water. The solution is extracted with ether and the extracts discarded. The water layer is boiled to remove residual ether, then acidified to pH 7 with acetic acid. The white precipitate is taken into ether, the ether extracts dried and evaporated to dryness. Recrystallization of the residue from isopropyl alcohol gives 6.5 grams (38% yield) of 2-(2'-pyridylmethyl)phenol, M. P. 95.0–97.0°.

Analysis: Calculated for $C_{12}H_{11}ON$

|   | Calculated | Found |
|---|---|---|
| C | 77.8 | 77.7 |
| H | 6.0 | 5.9 |

EXAMPLE 19

*2-(2'-thenyl)phenol*

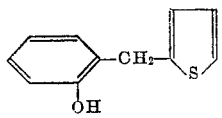

To a stirred solution of 256 grams (2.72 moles) of phenol in 1280 ml. of toluene heated to boiling under reflux was added portionwise 62.0 grams (2.7 gram atoms) of sodium. After all of the sodium was dissolved, a solution of 358.6 grams (2.72 moles) of 2-thenyl chloride in 500 ml. of toluene was added dropwise during 1.5 hours. The mixture was refluxed overnight, then cooled, treated with sufficient water to dissolve inorganic salts and rendered strongly acid (pH 2) with hydrochloric acid. The toluene layer was extracted with portions of 15% sodium hydroxide solution until a sample of extract gave no precipitate when acidified. The combined dark colored alkaline extracts (ca. 1 liter) were washed once with ether to remove residual neutral material, then cooled and acidified to pH 2 with 6 N hydrochloric acid. The liberated phenol was extracted with 1.5 liters of ether, and the extract was washed with sodium bicarbonate solution and dried over sodium sulfate. Following removal of the solvent from the filtered solution, the product distilled at 135–150° at less than 1 mm.; weight, 154.1 grams.

In order to eliminate the para isomer through its insoluble barium salt, the product was added to a boiling solution of 200 grams (1.17 moles) of barium hydroxide octahydrate. The mixture was boiled ten minutes, cooled to 10–15° and filtered. The filtrate was made strongly acid (pH 2) with hydrochloric acid and the product was extracted with ether. The ether extract was washed with sodium bicarbonate solution, dried over sodium sulfate and distilled to obtain 118 grams of pure 2-(2'-thenyl)-phenol, B. P. 130–132° at less than 1 mm.

EXAMPLE 20

*2-benzylphenyl beta-dimethylaminoethyl ether*

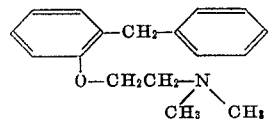

Sodium methylate is made by dropping 11.7 grams of sodium strips into 199 ml. of absolute methanol in a 1-liter three-necked flask. 93.9 grams of o-benzyl-phenol are dissolved in 200 ml. of dry toluene and added to the sodium methylate solution. The solution is distilled until the boiling point of toluene is reached. At the end of the distillation, enough toluene is added to restore the original volume of solvent.

One hundred nine and five tenths grams of dimethylaminoethyl chloride hydrochloride and 200 ml. of toluene are placed in a 1-liter Erlenmeyer flask, cooled in an ice bath, and decomposed with 167.5 grams of 20% sodium hydroxide solution. The toluene and water layers are separated, and the water layer is extracted again with 50 ml. of toluene. The toluene layers are combined, washed with saturated salt solution, and dried over anhydrous potassium carbonate.

The dried dimethylaminoethyl chloride solution is poured into the toluene solution of the sodium salt of o-benzylphenol, heated to reflux, and refluxed 16 hours. After refluxing, enough water is added to the mixture to dissolve the precipitated solid. The layers are separated, and toluene layer is further washed with water until the water extract is just slightly alkaline. The toluene solution is then made acid with 6 N hydrochloric acid and extracted with water until no cloudiness is produced when the extract is made alkaline. The acidic aqueous extract is washed with ether, then made alkaline with 20% sodium hydroxide solution, and extracted into ether. The ether solution is washed several times with water, then with saturated salt solution, and is dried over anhydrous potassium carbonate. The dried solution is filtered and distilled. The product distills at 143.5°/1 mm.; 69.7 grams of pale yellow oil are recovered.

Fifty-seven and one tenth grams of the free base are dissolved in ether and precipitated with dry HCl. 66.0 grams of crude hydrochloride are recovered. The hydrochloride is dissolved in 130 ml. of reagent acetone by boiling, filtered hot, and allowed to cool. The crystalline material obtained on cooling is filtered, washed with a little acetone, washed with ether, and dried in vacuo. Forty-four and eight tenths grams, M. P. 119.5 to 121°, are recovered from the first crop of crystals. Ethyl acetate may also be used as the solvent for recrystallization.

Analysis:

| | Calcd. for $C_{17}H_{22}ONCl$ | Found |
|---|---|---|
| C | 70.18 | 70.0 |
| H | 7.6 | 7.22 |
| N | 4.81 | 4.58 |

The following salts may be prepared by reacting the free base with the corresponding acid in a suitable solvent:

| | M. P., degrees |
|---|---|
| Oxalate | 159–160 |
| Picrate | 112–113 |
| Tartarate | 121.5–123.0 |
| Succinate | 104–105 |
| Maleate | 118–119 |
| Fumarate | 144–145 |
| Phosphate | 113–122 |
| 8-chlorotheophyllinate | 180–182 |

EXAMPLE 21

*2-benzylphenyl beta-diethylaminoethyl ether*

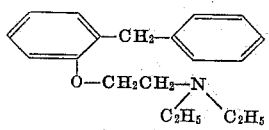

Three and two tenths grams of sodium are dissolved in 54 ml. of absolute methanol. Twenty-five and four tenths grams of o-benzylphenol are dissolved in 165 ml. of dry toluene and added to the solution of sodium methylate. The resulting solution is distilled until all the methanol is removed and the temperature is up to the boiling point of toluene.

Thirty-five grams of diethylaminoethyl chloride hydrochloride and 100 ml. of toluene are placed in a 500-ml. Erlenmeyer flask. The cooled mixture is made alkaline with 45 grams of 20% sodium hydroxide solution. When all the solid is dissolved, the mixture is filtered by suction. The toluene layer is separated from the water layer. The water is further extracted with 50 ml. of toluene. The toluene extracts are combined, washed with a little saturated salt solution, and dried over anhydrous potassium carbonate.

The dried and filtered diethylaminoethyl chloride solution is added to the hot toluene solution of the sodium salt of o-benzylphenol. The mixture is stirred and heated to reflux. It is refluxed about 12 hours.

One hundred fifty ml. of water are added to the mixture to dissolve the precipitated solid and the layers are separated.

The toluene layer is washed with 27 grams of 20% sodium hydroxide and then with 200 ml. of water in 50 ml. portions. It is finally washed with saturated salt solution and dried over anhydrous potassium carbonate.

The dried and filtered solution is distilled at reduced pressure. Thirty grams of a pale yellow oil are recovered; B. P. 160–164°/<1 mm.

Thirty grams of the base are dissolved in ether and the hydrochloride is precipitated by piping in dry hydrogen chloride. Thirty-three and three tenths grams, M. P. 155–157°, of the crude hydrochloride are recovered. It is dissolved in 110 ml. of hot isopropanol which, on cooling, deposits small white crystals. Thirty and eight tenths grams are recovered which are again dissolved in 84 ml. isopropanol and recrystallized. Yield, 29.9 grams, M. P. 158–159°.

Analysis:

| | Calcd. for $C_{19}H_{26}ONCl$ | Found |
|---|---|---|
| C | 71.5 | 71.4 |
| H | 8.2 | 8.12 |

EXAMPLE 22

*2-benzylphenyl beta-(1-piperidyl)-ethyl ether*

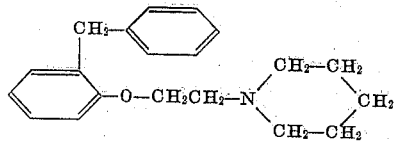

Fifty-nine and seven tenths grams (0.26 mole) of metallic sodium is dissolved in 102 ml. of absolute methanol. When the sodium is dissolved, the alcohol is distilled off. To the methoxide is added 47.9 grams (0.26 mole) of o-benzylphenol dissolved in about 300 ml. of toluene.

Meanwhile, 96.0 grams (0.52 mole) of piperidylethyl chloride hydrochloride is covered with 250 ml. of toluene and decomposed with a solution of 23 grams of sodium hydroxide pellets dissolved in 46 ml. of water. The aqueous layer is withdrawn and the toluene layer washed twice with a saturated solution of sodium chloride. It is dried over potassium carbonate while shaking. It is then filtered and added to the solution of the methoxide and o-benzylphenol and the mixture refluxed and stirred for 20 hours.

The tan turbin solution is transferred to a separatory funnel and washed twice with water. It is then extracted with four 50-ml. portions of 3-molar hydrochloric acid. The combined acid extracts are washed with a small portion of ether and made strongly basic with a 20% solution of sodium hydroxide. This is extracted with 500 ml. of ether in several portions. The combined ether extracts are washed twice with a saturated salt solution and dried over potassium carbonate.

The dried etheral solution is filtered and the ether removed by distillation. The residue is distilled at diminished pressure collecting two fractions:

Fraction one: 164–182°/1 mm., wt. 33.9 grams
Fraction two: 180–183°/1 mm., wt. 37.5 grams Both fractions are clear yellow liquids.

Both fractions are converted to the hydrochloride by piping dry hydrogen chloride into an etheral solution of the base:

Fraction one: wt. 37.7 grams., M. P. 135–139°
Fraction two: wt. 41.7 grams., M. P. 135–139°

The combined fractions are recrystallized in acetone; wt. 47.6 g., M. P. 135–141°.

Analysis:

| | Calcd. for $C_{20}H_{26}ClNO$ | Found |
|---|---|---|
| C | 73.00 | 72.4 |
| H | 7.92 | 7.83 |

EXAMPLE 23

*2-benzylphenyl beta-(4-morpholinyl)-ethyl ether*

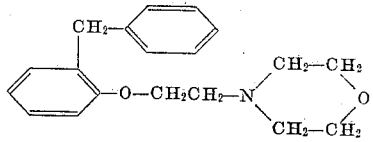

Five and seventy-five hundredths (0.25 mole) grams of metallic sodium is dissolved in 98 ml. (17 ml. of methyl alcohol, absolute, per gram of sodium) of methyl alcohol, absolute. When the sodium is dissolved, the alcohol is distilled off. To the methoxide is added 46.06 grams (0.25 mole) of o-benzylphenol dissolved in about 300 ml. of toluene.

Meanwhile, 93.04 grams (0.5 mole) of beta-4-morpholinylethyl chloride hydrochloride is decomposed by dissolving it in a solution of 22 grams of sodium hydroxide pellets dissolved in 44 ml. of water covered with 200 ml. of toluene. The aqueous fraction is withdrawn, the toluene fraction washed twice with a saturated salt solution and dried over potassium carbonate while shaking. It is then filtered and added to the solution of the methoxide and o-benzylphenol. The combined solutions are refluxed and stirred for 16 hours.

The tan solution is transferred to a separatory funnel and washed twice with water. It is extracted with four 50-ml. portions of 3 molar hydrochloric acid. With cooling and "scratching," the product crystallizes. It is collected by suction and dried in vacuo, wt. 75.5 grams, M. P. 182–185°.

The white crystalline product is recrystallized in absolute alcohol, wt. 71.2 grams, M. P. 183–185°.

Another recrystallization from absolute methanol raises the melting point to 184–185°.

Analysis:

|   | Calcd. for $C_{19}H_{24}O_2NCl$ | Found |
|---|---|---|
| C | 68.5 | 68.5 |
| H | 7.25 | 7.24 |

EXAMPLE 24

*2-benzylphenyl beta-dimethylaminoisopropyl ether (No. 1) and 2-benzylphenol beta-dimethylaminopropyl ether (No. 2)*

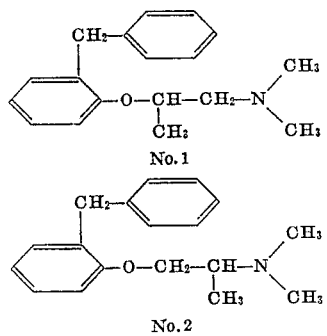

Six and nine tenths grams of sodium are dissolved in 117 ml. of absolute methanol in a 3-necked 500 ml. flask. Fifty-five and two tenths grams of solid o-benzylphenol are added to the sodium methylate solution, dissolved, and the resulting solution subjected to reduced pressure distillation. The methanol comes off, leaving the solid, white sodium salt of o-benzylphenol. One hundred eighty ml. of dry toluene are added and the distillation is continued at atmospheric pressure till the boiling point of toluene is reached. Enough additional toluene is added to bring the volume up to what is lost in the distillation.

Fifty-nine and five tenths grams, B. P. 118–120° of freshly distilled dimethylamino chloropropane, obtained by the action of thionyl chloride on 1-dimethylaminopropanol-2, is added to the warm toluene solution of the sodium salt of o-benzyl-phenol and the resulting solution is heated to reflux. Refluxing is continued for six hours.

Two hundred ml. of water are added, the precipitated solid dissolves in the water, and the water and organic layers are separated. The toluene layer is washed with 60 ml., 20% sodium hydrochloride, then several times with water and finally with saturated salt solution. It is then made acid with 1:1 hydrochloric acid and extracted with water until there is no cloudiness when the extract is made alkaline. The acid extract is washed with ether, then it is made alkaline with 50% sodium hydroxide solution. The base, a pale yellow oil, separated to the top. The water layer is drawn off and extracted with a 100 ml. and 50 ml. portion of ether. The ether solutions are combined with the oil, a little more ether is added and the solution is dried over anhydrous potassium carbonate. Before drying, the ether solution is washed with three 50-ml. portions of water and one of saturated salt solution.

The dried solution is distilled at reduced pressure. Two cuts are made.

Cut No. 1: 27.5 grams, B. P. 148–152°/1 mm.
Cut No. 2: 19.4 grams, B. P. 152.5–157°/1 mm.

They are both clear colorless oils.

The hydrochloride is made of the material by dissolving the base in ether and precipitating the hydrochloride with dry hydrogen chloride. The crude hydrochloride is dissolved in reagent acetone and recrystallized. In attempting to crystallize the material again from acetone, it is found to be insoluble. Ten and four tenths grams, M. P. 170–171.5° are recovered.

Analysis: Hydrochloride No. 1:

|   | Calculated | Found |
|---|---|---|
| C | 70.7 | 70.7 |
| H | 7.92 | 7.88 |

The acetone mother liquors are concentrated by distilling off the acetone. It is then dissolved in water, made alkaline with 20% sodium hydroxide solution, and extracted into ether. The ether solution is dried over anhydrous potassium carbonate. The dried ether solution is treated with dry HCl and the hydrochloride precipitates. This material after being thoroughly washed with ether and dried under vacuum is dissolved in hot ethyl acetate and crystallized. After two crystallizations from ethyl acetate, 23 grams, M. P. 79–82° are recovered.

Analysis: Hydrochloride No. 2:

|   | Calculated | Found |
|---|---|---|
| C | 70.7 | 70.8 |
| H | 7.92 | 8.30 |

The proof of structure of 2-benzylphenyl beta-dimethylaminopropyl ether is accomplished by the following unequivocal synthesis:

*(2-benzyl)phenoxy acetone.*—Following the general procedure of Hurd and Perletz, J. A. C. S. 68, 38–40 (1946), for the preparation of phenoxy-acetone, 184 grams (1 mole) of o-benzylphenol, 34 grams of potassium carbonate and 200 ml. of dry acetone were placed in a 2 l., three-necked flask and stirred and refluxed for fifteen minutes. To this stirred mixture was added in four equal portions a mixture of 138 grams (1.5 moles) of chloroacetone, 3 grams of potassium iodide and 130 ml. of acetone which had stood for 24 hours: 34 grams of potassium carbonate and 50 ml. of acetone were added after each addition of halide. After 28 hours of refluxing and stirring, the mixture was filtered through a sintered glass funnel, and the filtrate was concentrated. Attempted distillation of the residue gave considerable decomposition. The residue was dissolved in ether, washed with 10% sodium hydroxide until basic, charcoaled, filtered and stripped. After standing for several days, the residual dark oil set up. Successive recrystallizations from cyclohexane, ethanol and isopropanol gave 52 grams (21.5%) of material of M. P. 64–66°. The low yield may be partially ascribed to the decomposition during distillation.

Analysis:

|   | Calcd. for $C_{16}H_{16}O_2$ | Found |
|---|---|---|
| C | 80.0 | 80.1 |
| H | 6.71 | 6.68 |

*(2-benzyl)phenoxy acetone oxime.*—A mixture of 44.5 grams (0.185 mole) of (2-benzyl)phenoxy acetone, 44.5 grams (0.64 mole) of hydroxylamine hydrochloride, 225 ml. of pyridine and 225 ml. of absolute ethanol was refluxed for two hours. When the residual oil cooled, it was triturated thoroughly with 225 ml. of water, cooled in ice-salt and scratched. The separated solid was collected by filtration, washed with water and recrystallized from absolute ethanol and then from isopropanol. Yield, 30.0 grams (63.5%), M. P. 97–98.5°. The analysis sample was recrystallized from ethanol-water, M. P. 100–102°.

Analysis:

|   | Calcd. for $C_{16}H_{17}NO_2$ | Found |
|---|---|---|
| C | 75.4 | 75.6 |
| H | 6.71 | 6.92 |

*Beta-(2-benzyl)phenoxyispropylamine.*—A solution of 30 grams (0.12 mole) of (2-benzyl)phenoxy acetone oxime in 450 ml. of dry ether was added to a stirred suspension of 4.5 grams (0.12 mole) of lithium aluminum hydride in 300 ml. of dry ether over a 30 minute period. The mixture was stirred for 1½ hours at room temperature, and the excess hydride was destroyed by cautious addition of ice. Four hundred ml. of saturated potassium sodium tartrate solution were added with stirring; the ether layer was separated, and the aqueous layer extracted twice with ether. The combined ether layer and extracts were washed twice with saturated sodium chloride solution, dried over anhydrous potassium carbonate and distilled under reduced pressure. Distillation was erratic, but a good fraction was obtained at 175–6°/1.5 mm.

The main fractions were combined, dissolved in ether and treated with hydrogen chloride. The precipitate was recrystallized once from isopropanol, M. P. 146–147°. The yield of hydrochloride was 11.5 grams (35%).
Analysis:

|   | Calcd. for $C_{18}H_{20}ONCl$ | Found |
|---|---|---|
| C | 69.1 | 68.9 |
| H | 7.25 | 7.32 |

*2-benzylphenyl beta-dimethylaminopropyl ether.*—Nine and one tenth grams (0.033 mole) of beta-(2-benzyl)-phenoxyisopropylamine hydrochloride was neutralized with 10% sodium hydroxide and the base taken up into ether. Washing with water and then saturated salt solution, drying over anhydrous potassium carbonate and stripping, yielded 8.0 grams of amine. This was dimethylated by the procedure of Organic Syntheses, 25, 89, and the product taken up in ether, washed with water and dried over potassium carbonate. The amine was not isolated.

*Dihydrogen citrate.*—To the ethereal solution of 2-benzylphenyl beta-dimethylaminopropyl ether was added a solution of 7.7 grams (0.04 mole) of anhydrous citric acid in 12 ml. of water. After standing overnight, the mixture was filtered, and the white solid was recrystallized twice from ethanol. Rosettes of needles, M. P. 119–121° (dec.). The yield was 8.2 grams (54%).
Analysis:

|   | Calcd. for $C_{24}H_{31}NO_8$ | Found |
|---|---|---|
| C | 62.4 | 62.4 |
| H | 6.77 | 6.76 |

*Methiodide.*—Four grams of 2-benzylphenyl beta-dimethylaminopropyl ether dihydrogen citrate was treated with sodium hydroxide, and the base taken up in ether. To the dried ethereal solution of amine was added 5 ml. of methyl iodide. After standing overnight, the mixture was cooled, and the white solid was collected by filtration and recrystallized once from ethanol to give 2 grams of material, M. P. 154.5–155.5°.
Analysis:

|   | Calcd. for $C_{19}H_{26}INO$ | Found |
|---|---|---|
| C | 55.5 | 55.5 |
| H | 6.38 | 6.45 |

*2-benzylphenyl-beta-dimethylaminopropyl ether dihydrogen citrate.*—A concentrated aqueous solution of the hydrochloride of the low melting (M. P. 75–82°) isomer from the reaction between 2-benzylphenol and 1-dimethylamino-2-chloropropane (hydrochloride No. 2) was shaken with 50 ml. of 10% sodium hydroxide, and the free base extracted into ether. The combined ether extracts were dried over anhydrous $K_2CO_3$, filtered, and diluted to 170 ml. with dry ether. Eighty-five ml. of this solution was allowed to stand overnight with a solution of 2.64 grams of anhydrous citric acid in 4 ml. of water. The suspension was cooled, and the crystalline compound was collected by filtration and recrystallized from alcohol. Weight, 4.2 grams, M. P. 120–121.5° (dec.).
Analysis:

|   | Calcd. for $C_{24}H_{31}NO_8$ | Found |
|---|---|---|
| C | 62.4 | 61.8 |
| H | 6.76 | 6.77 |

A mixed melting point determination with an authentic sample of 2-benzylphenyl - beta - dimethylaminopropyl ether dihydrogen citrate, M. P. 119–121° (dec.), gave a value of 121–122° (dec., sinters at 118°).

*2-benzylphenyl-beta-dimethylaminopropyl ether methiodide.*—The other half (85 ml.) of the ethereal solution of amine prepared in the preceding experiment was treated with 5 ml. of methyl iodide and allowed to stand overnight at room temperature. The crystalline compound which separated was filtered off and recrystallized from water and again from ethanol, M. P. 154.5–156°. A mixed melting point with an authentic sample of 2-benzylphenyl-beta-dimethylaminopropyl ether methiodide gave 154.5–156°.

Equations for structural proof:

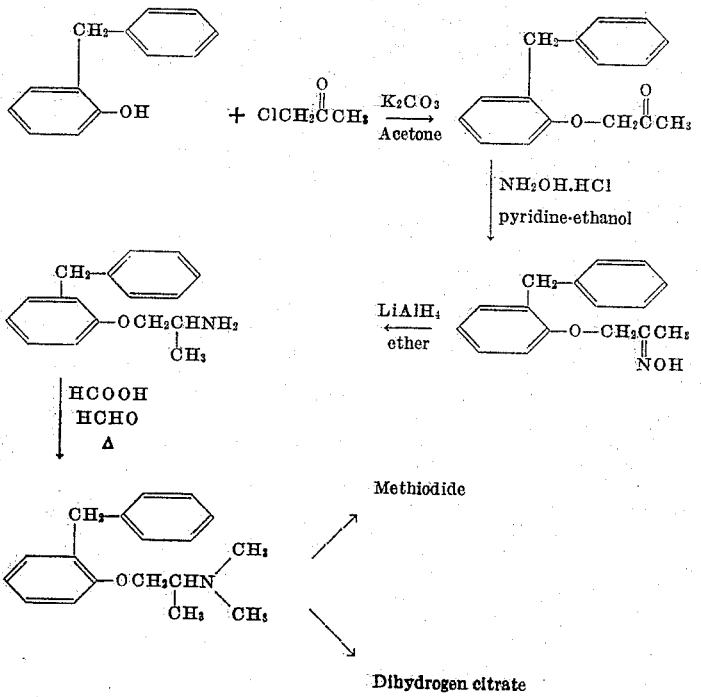

EXAMPLE 25

*2-benzylphenyl dimethylaminopropyl ether dihydrogen citrate*

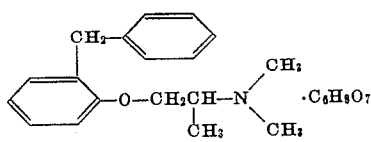

An aqueous solution of 7.0 grams of 2-benzylphenyl dimethylaminopropyl ether hydrochloride, the preparation of which is described in Example 24, and which is designated "hydrochloride No. 2" therein, is made basic with 50 ml. of 10% sodium hydroxide and the liberated basic ether extracted into ether. The ether extracts are dried over anhydrous potassium carbonate and filtered. To one-half of the resulting solution is added 2.64 grams of anhydrous citric acid and the mixture allowed to stand overnight. The crude salt is collected by filtration and recrystallized from 95% ethanol to give 2-benzylphenyl dimethylaminopropyl ether dihydrogen citrate, M. P. 120.0–121.5°.

Analysis:

|   | Calcd. for $C_{24}H_{31}O_8N$ | Found |
|---|---|---|
| C | 62.4 | 61.8 |
| H | 6.77 | 6.76 |

EXAMPLE 26

*4-benzylphenyl beta-dimethylaminoethyl ether*

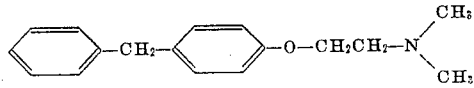

Two and eight tenths grams of sodium are cut into strips and dissolved in 48 ml. of absolute methanol in a 500 ml. three-necked flask. Twenty-two and three tenths grams of 4-benzylphenol are added and dissolved. The methanol is distilled off at reduced pressure leaving the white sodium salt of p-benzylphenol.

Thirty-four and five tenths grams of dimethylaminoethylchloride hydrochloride are put with 70 ml. of toluene into a 500 ml. Erlenmeyer flask, cooled and decomposed with 52 grams of 20% sodium hydroxide. The toluene and water layers are separated, and the water layer is extracted with 40 ml. more of toluene. The toluene layers are combined, washed with saturated salt solution, and dried over anhydrous potassium carbonate.

One hundred twenty ml. of dry toluene are added to the sodium salt of p-benzylphenol and, with stirring, the mixture is heated and solvent distilled off until the boiling point of toluene is reached. One hundred additional ml. of toluene are added. The mixture is allowed to cool below the reflux temperature, and to it, with stirring, is added the dried solution of dimethylaminoethyl chloride. The mixture is then heated to reflux and refluxed for 24 hours.

The solution is treated with enough water to dissolve the precipitated solid and the layers are separated. The toluene layer is washed with more water. The toluene layer is made acid with 1:1 hydrochloric acid and the layers separated. It is extracted further with water until the extract does not become cloudy on being made alkaline. The acid extract is washed with ether and is then made basic with 50% sodium hydroxide solution. The product separates to the top as a yellow oil. The oil is separated and the water layer is further extracted with two 100-ml. portions of ether. The ether and oil layers are combined, washed with five 50-ml. portions of water, a little saturated salt solution, and dried over anhydrous potassium carbonate.

The solution is distilled at reduced pressure. Nineteen and eight tenths grams of product, boiling point 152–153°/1 mm., are recovered.

Nineteen and eight tenths grams of the base are dissolved in ether and the hydrochloride is precipitated as a fine white powder with dry hydrogen chloride. This material is recrystallized from isopropanol. It crystallized in long flat crystals. Weight, 21.6 grams, M. P. 179–182°.

Analysis:

|   | Calcd. for $C_{17}H_{22}ONCl$ | Found |   |
|---|---|---|---|
| C | 70.1 | 69.8 | 70.4 |
| H | 7.6 | 7.52 | 7.64 |

EXAMPLE 27

*Beta-dimethylaminoethyl 2-(2′ thenyl)-phenyl ether*

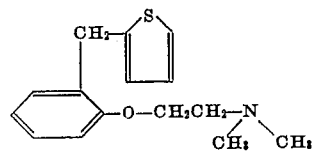

A stirred solution of 118.7 grams of o-(2-thenyl)-o-cresol in 660 ml. of toluene was distilled until all traces of water and 130 ml. of toluene had been removed from the system. To this dry solution was then added a solution of sodium methoxide freshly prepared from 14.6 grams (0.635 gram atom) of sodium and 225 ml. of absolute methanol. In order to remove the methanol, distillation was continued until constant boiling point of 109° was observed and 640 ml. of distillate was collected. A solution of 0.95 mole of beta-dimethylaminoethyl chloride in 250 ml. of dry toluene was then added to the cooled suspension of the phenate and the stirred mixture was refluxed for 18 hours. The cooled suspension of the phenate was extracted with 395 ml. of 3 N hydrochloric acid in six portions and the combined acid extracts were washed with ether, made strongly basic with 10% sodium hydroxide solution and extracted with 700 ml. of ether in three portions. After drying over potassium carbonate, the extract was freed of solvent and the product was collected at 158–165°/1 mm. with the major portion distilling at 159–160°, weight, 129.6 g.

Analysis:

|   | Calcd. for for the base $C_{15}H_{19}NOS$ | Found |
|---|---|---|
| C | 68.9 | 68.2 |
| H | 7.33 | 7.80 |

The hydrochloride salt was prepared by dissolving 64.2 grams of the base in dry ether and saturating the solution with dry hydrogen chloride. The solid which precipitated melted at 129–130° after recrystallization from acetone; wt., 531 grams.

EXAMPLE 28

*4-ethoxy-2-benzylphenyl beta-dimethylamino-ethyl ether*

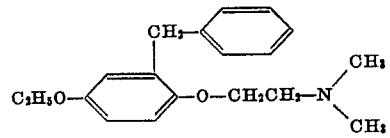

To a well stirred, ice-cold suspension of 68 grams of beta-dimethylaminoethyl chloride hydrochloride in 70 cc. of toluene is added slowly 36 cc. of 50% potassium hydroxide solution. The mixture is stirred for about fifteen minutes, and the toluene layer is decanted. The aqueous sludge is stirred with two more 70-cc. portions of fresh toluene in the same manner and the combined toluene solution dried by shaking over anhydrous potassium carbonate for four hours.

A solution of 83.2 grams of 4-ethoxy-2-benzylphenol in 250 cc. of toluene is added dropwise to a stirred suspension of 8.7 grams of sodium hydride in 250 cc. of toluene. An exothermic reaction occurs with the evolution of hydrogen. The mixture is refluxed for two hours to insure complete reaction. To the resulting mixture, maintained at gentle reflux, is added dropwise the above described solution of beta-dimethylaminoethyl chloride. Sodium chloride begins to precipitate out almost immediately. After 17 hours' refluxing, the reaction mixture is hydrolyzed with water and the toluene layer separated, washed with Claisen's alkali, dried and stripped. Distillation of the residue gives 86.4 grams of 4-ethoxy-2-benzylphenyl beta-dimethylaminoethyl ether, B. P. 167–171°/1 mm.

A solution of 34.3 grams of this basic ether in 250 cc. of ether is cooled to ice-bath temperature and saturated with dry hydrogen chloride. After standing overnight in a cold room, the solid material is collected by filtration; there are obtained 24.4 grams, M. P. 130–134°. Recrystallization from isopropanol petroleum ether gives white crystals of 4-ethoxy-2-benzylphenyl beta-dimethylaminoethyl ether hydrochloride, M. P. 136.0–137.0°.

Analysis:

|   | Calcd. for $C_{19}H_{26}O_2NCl$ | Found |
|---|---|---|
| C | 67.9 | 67.7 |
| H | 7.8 | 7.6 |

In a manner similar to that described above there are obtained a number of other basic ethers from various substituted phenols and beta-dimethylaminoethyl chloride.

EXAMPLE 29

*2-benzyl-4-tolyl beta-dimethylaminoethyl ether*

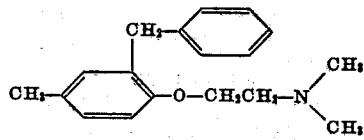

B. P. 168–174°/3 mm. Hydrochloride: M. P. 126.5–128.0°.

Analysis:

|   | Calcd. for $C_{18}H_{24}ONCl$ | Found |
|---|---|---|
| C | 70.7 | 70.7 |
| H | 7.9 | 8.2 |

EXAMPLE 30

*4-chloro-2-benzylphenyl beta-dimethylaminoethyl ether*

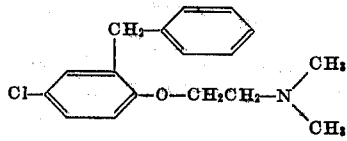

B. P. 172–176°/1 mm. Hydrochloride: M. P. 173.5–175.5°.

Analysis:

|   | Calcd. for $C_{17}H_{21}ONCl_2$ | Found |
|---|---|---|
| C | 62.6 | 62.7 |
| H | 6.5 | 6.5 |

EXAMPLE 31

*4-methoxy-2-benzylphenyl beta-dimethylaminoethyl ether*

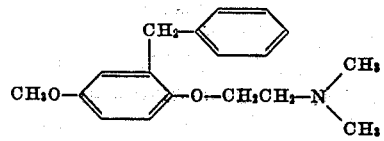

B. P. 174–177°/1 mm. Hydrochloride: M. P. 131.0–132.0°.

Analysis:

|   | Calcd. for $C_{18}H_{24}O_2NCl$ | Found |
|---|---|---|
| C | 67.2 | 67.3 |
| H | 7.5 | 7.6 |

EXAMPLE 32

*4-cyclohexyl-2-benzylphenyl beta-dimethylaminoethyl ether*

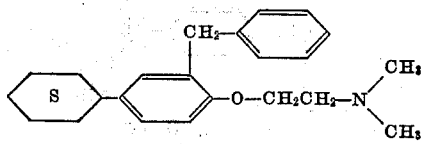

B. P. 186–190°/1 mm. Hydrochloride: M. P. 152.0–154.0°.

Analysis:

|   | Calcd. for $C_{23}H_{32}ONCl$ | Found |
|---|---|---|
| C | 73.9 | 72.8 |
| H | 8.6 | 8.4 |

EXAMPLE 33

*4-tertiary butyl-2-benzylphenyl beta-dimethylaminoethyl ether*

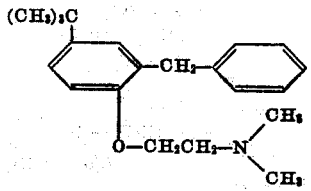

B. P. 137–140°/1 mm. Hydrochloride: M. P. 162.5–164.0°.

Analysis:

|   | Calcd. for $C_{21}H_{30}ONCl$ | Found |
|---|---|---|
| C | 72.5 | 72.6 |
| H | 8.7 | 8.8 |

EXAMPLE 34

*2-(4'-methoxybenzyl)phenyl beta-dimethylaminoethyl ether*

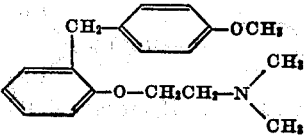

B. P. 149–152°/1 mm. Hydrochloride: M. P. 123.0–126.0°.

Analysis:

|   | Calcd. for $C_{18}H_{24}O_2NCl$ | Found |
|---|---|---|
| C | 67.2 | 67.0 |
| H | 7.5 | 7.5 |

EXAMPLE 35

*2-(4'-chlorobenzyl)phenyl beta-dimethylaminoethyl ether*

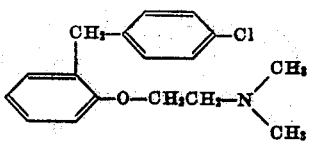

B. P. 179–185°/3 mm. Hydrochloride: M. P. 152.0–153.0°.

Analysis:

|   | Calcd. for $C_{17}H_{21}ONCl_2$ | Found |
|---|---|---|
| C | 62.6 | 62.3 |
| H | 6.5 | 6.9 |

EXAMPLE 36

*2-(4'-isopropylbenzyl)phenyl beta-dimethylaminoethyl ether*

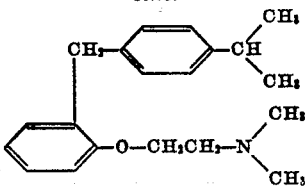

B. P. 151–152°/1 mm. Hydrochloride: M. P. 144.0–145.5°.
Analysis:

|  | Calcd. for $C_{20}H_{28}ONCl$ | Found |
|---|---|---|
| C | 71.9 | 72.1 |
| H | 8.5 | 8.5 |

EXAMPLE 37

*2-(2',3'-dimethoxybenzyl)phenyl beta-dimethylaminoethyl ether*

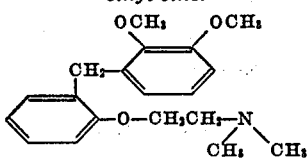

B. P. 164–166°/1 mm.
Analysis:

|  | Calcd. for $C_{19}H_{25}O_3N$ | Found |
|---|---|---|
| C | 72.3 | 72.2 |
| H | 8.0 | 8.2 |

EXAMPLE 38

*2-cinnamylphenyl beta-dimethylaminoethyl ether*

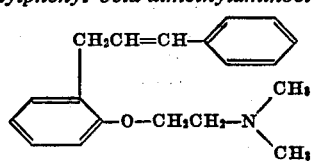

B. P. 137–141°/1 mm. Hydrochloride: M. P. 154.0–156.5°.
Analysis:

|  | Calcd. for $C_{19}H_{24}ONCl$ | Found |
|---|---|---|
| C | 71.8 | 71.9 |
| H | 7.6 | 7.8 |

EXAMPLE 39

*2 - (5' - chloro - 2' - thenyl)phenyl beta-dimethylaminoethyl ether*

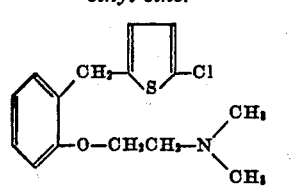

B. P. 149–150°/1 mm. Hydrochloride: M. P. 103.0–106.0°.
Analysis:

|  | Calcd. for $C_{15}H_{19}ONCl_2S$ | Found |
|---|---|---|
| C | 54.2 | 54.3 |
| H | 5.8 | 5.7 |

EXAMPLE 40

*2 - (2' - chlorobenzyl)phenyl beta - dimethylaminoethyl ether*

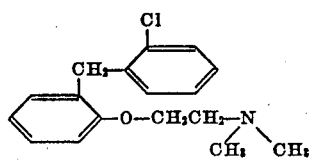

B. P. 155–167°/1 mm. Hydrochloride: M. P. 139.5–142.5°.
Analysis:

|  | Calcd. for $C_{17}H_{21}ONCl_2$ | Found |
|---|---|---|
| C | 62.6 | 62.5 |
| H | 6.5 | 6.5 |

EXAMPLE 41

*2 - (3' - chlorobenzyl)phenyl beta-dimethylaminoethyl ether*

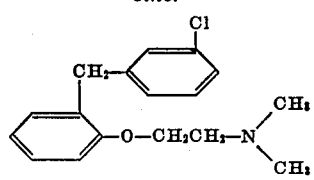

B. P. 146–152°/1 mm. Hydrochloride: M. P. 120.0–121.5°.
Analysis:

|  | Calcd. for $C_{17}H_{21}ONCl_2$ | Found |
|---|---|---|
| C | 62.6 | 62.3 |
| H | 6.5 | 6.6 |

EXAMPLE 42

*2 - chloro - 6 - benzylphenyl beta - dimethylaminoethyl ether*

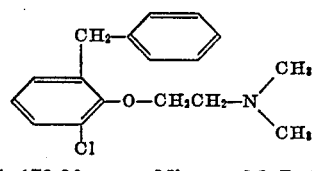

B. P. 160°/1–173.3° mm. Nitrate: M. P. 93.0–96.0°.
Analysis:

|  | Calcd. for $C_{17}H_{21}O_4N_2Cl$ | Found |
|---|---|---|
| C | 57.9 | 57.8 |
| H | 6.0 | 6.1 |

EXAMPLE 43

*4 - chloro - 2 - (4' - chlorobenzyl)phenyl beta - dimethylaminoethyl ether*

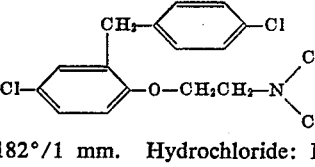

B. P. 177–182°/1 mm. Hydrochloride: M. P. 150.0–152.0°
Analysis:

|  | Calcd. for $C_{17}H_{20}ONCl_3$ | Found |
|---|---|---|
| C | 56.6 | 56.6 |
| H | 5.6 | 5.8 |

EXAMPLE 44

1 - benzyl - 2 - naphthyl beta - dimethylaminoethyl ether

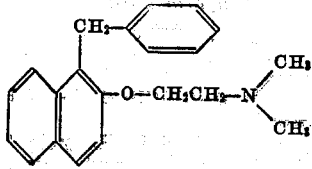

B. P. 184.192°/1.5 mm. Hydrochloride: M. P. 178.0–181.0°.

Analysis:

|   | Calcd. for C₂₁H₂₄ONCl | Found |
|---|---|---|
| C | 73.8 | 73.8 |
| H | 7.1 | 7.1 |

EXAMPLE 45

2 - benzyl - 1 - naphthyl beta - dimethylaminoethyl ether

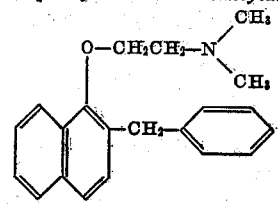

B. P. 200–207°/2 mm. Hydrochloride: M. P. 183.5–185.5°.

Analysis:

|   | Calcd. for C₂₁H₂₄ONCl | Found |
|---|---|---|
| C | 73.8 | 73.6 |
| H | 7.1 | 7.4 |

EXAMPLE 46

2 - (4' - bromobenzyl)phenyl beta-dimethylaminoethyl ether

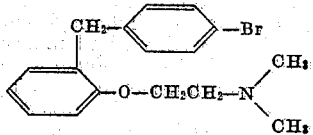

B. P. 162–165°/1 mm. Hydrochloride: M. P. 158.0–160.5°

Analysis:

|   | Calcd. for C₁₇H₂₁ONBrCl | Found |
|---|---|---|
| C | 55.1 | 55.1 |
| H | 5.7 | 5.9 |

EXAMPLE 47

2-(2',4'-dichlorobenzyl)phenyl beta-dimethylaminoethyl ether

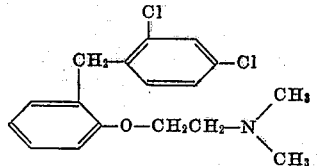

B. P. 149–152°/1 mm. Hydrochloride: M. P. 139.5–141.0°.

Analysis:

|   | Calcd. for C₁₇H₂₀ONCl₃ | Found |
|---|---|---|
| C | 56.6 | 56.7 |
| H | 5.6 | 5.7 |

EXAMPLE 48

4,6 - dichloro - 2 - benzylphenyl beta - dimethylaminoethyl ether

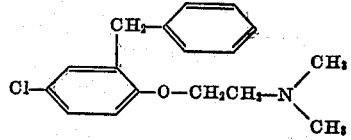

B. P. 159–163°/1 mm. Hydrochloride: M. P. 137.5–140.5°.

Analysis:

|   | Calcd. for C₁₇H₂₀ONCl₃ | Found |
|---|---|---|
| C | 56.6 | 56.4 |
| H | 5.6 | 5.6 |

EXAMPLE 49

Dimethyl 2-benzylphenoxyacetamidine hydrochloride

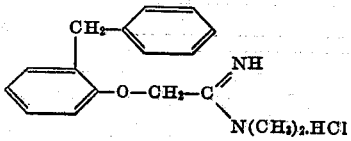

To a vigorously stirred and refluxing suspension of 108 grams and 2-benzylphenol and 79 grams of anhydrous potassium carbonate in 100 cc. of methyl ethyl ketone is added dropwise over a period of two hours a solution of 49 grams of chloroacetonitrile in 45 cc. of methyl ethyl ketone. This solution of chloroacetonitrile has stood overnight in the dark in the presence of 1.5 grams of sodium iodide. The reaction mixture is refluxed one hour after the addition of the nitrile solution has been completed, then 130 cc. of solvent stripped. The residue is taken up in dilute hydrochloric acid and ether and the insoluble material removed by filtration. The filtrate is extracted several times with ether; the combined ether extracts washed in turn with 10% potassium hydroxide solution, saturated sodium bisulfite solution, dried and stripped. Distillation of the residue in vacuo gives 108.3 grams of 2-benzylphenoxyacetonitrile, B. P. 137–143°/1 mm.

Dry hydrogen chloride is passed into an ice-cold solution of 105 grams of the above nitrile in 100 cc. of chloroform and 23 grams of absolute ethanol until the gain in weight amounts to 18.2 grams. Dilution of the solution with 700 cc. of ether causes the precipitation of a white crystalline material, which is collected and dried: 102.6 grams, M. P. 108.5–111.0°. The precipitation of ethyl 2-benzylphenoxyacetimidate hydrochloride as a white crystalline mass, is collected and dried: 102 grams, M. P. 108.5–111.0°.

Dimethylamine is passed into 60 grams of absolute ethanol until the gain in weight equals 5.9 grams. To this solution is added all at once 30.5 grams of ethyl 2-benzylphenoxyacetimidate hydrochloride. The mixture is shaken vigorously in a sealed bottle for 72 hours. At the end of this time, a suspension of white crystals was present. Ether was added until no further precipitation occurred, and the insoluble material was collected by filtration: 20.6 grams M. P. 181–208°. The crude dimethyl 2-benzylphenoxyacetamidine hydrochloride was recrystallized from 95% ethanol; M. P. 218–226°.

Analysis:

|   | Calcd. for C₁₇H₂₁ON₂Cl | Found |
|---|---|---|
| C | 67.0 | 67.1 |
| H | 6.9 | 6.9 |

EXAMPLE 50

2-(o-benzylphenoxy)methylimidazoline

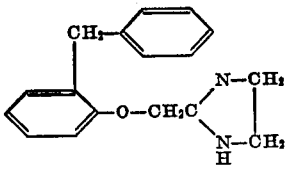

A solution of 92 grams (0.5 mole) of o-benzylphenol in 200 cc. of benzene is added dropwise to a stirred suspension of 12 grams (0.5 mole) of sodium hydride in 100 cc. of benzene. After the addition had been completed, the reaction mixture was refluxed for 30 minutes. To the hot solution was added dropwise 61 grams (0.5 mole) of ethyl chloroacetate, whereupon sodium chloride began to precipitate. The mixture was refluxed 20 hours, then cooled and hydrolyzed with ice and hydrochloric acid. The benzene layer was separated, washed with dilute sodium hydroxide solution, dried and stripped. Distillation of the residue gave 108 grams (80% yield) of ethyl o-benzylphenoxyacetate, B. P. 177–180°/3 mm.
Analysis:

|   | Calcd. for $C_{17}H_{18}O_3$ | Found |
|---|---|---|
| C | 75.5 | 76.1 |
| H | 6.7 | 6.4 |

A mixture of 54 grams (0.2 mole) of ethyl o-benzylphenoxyacetate and 50 grams (0.6 mole) of anhydrous ethylene diamine was heated for 34 hours on a steam bath in a sealed bottle. Distillation of the resulting oil gave 39.9 grams (75% yield) of 2-(o-benzylphenoxy)-methylimidazoline, B. P. 203–207°/1 mm. The imidazoline was recrystallized from benzene-petroleum ether to give white crystals, M. P. 90.0–91.0°.
Analysis:

|   | Calcd. for $C_{17}H_{18}ON_2$ | Found |
|---|---|---|
| C | 76.7 | 76.7 |
| H | 6.8 | 6.8 |
| N | 10.5 | 10.6 |

EXAMPLE 51

2-benzylphenyl beta-isopropylaminoethyl ether hydrochloride

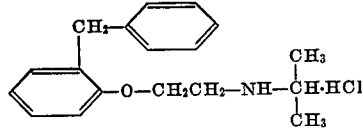

Thirty-four grams (0.58 mole) of isopropylamine is added slowly to a solution of 56.3 grams (0.193 mole) of 2-benzylphenyl beta-bromoethyl ether, which may be prepared by reacting sodium 2-benzylphenoxide with ethylene dibromide, in 80 ml. of dioxane. The container is sealed and the mixture heated on the steam bath overnight. The solvent and excess isopropylamine are distilled under reduced pressure. The residue is treated with an excess of sodium hydroxide and the liberated basic ether taken up in ether. On shaking the ether extract with 6 N hydrochloric acid, the hydrochloride precipitates. Recrystallization from water gives 47.7 grams (81% yield) of 2-benzylphenyl beta-isopropylaminoethyl ether hydrochloride, M. P. 174–175°.
Analysis:

|   | Calcd. for $C_{18}H_{24}ONCl$ | Found |
|---|---|---|
| C | 70.8 | 70.8 |
| H | 7.9 | 7.9 |

EXAMPLE 52

2-benzylphenyl beta-methylaminoethyl ether hydrochloride

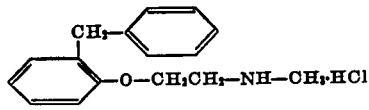

In the manner described in Example 51, but using methylamine in place of isopropyl amine, there is obtained 2-benzylphenyl beta-methylaminoethyl ether hydrochloride, M. P. 178.5–179.5°.
Analysis:

|   | Calcd. for $C_{16}H_{20}ONCl$ | Found |
|---|---|---|
| C | 69.3 | 69.5 |
| H | 7.2 | 7.1 |

EXAMPLE 53

2-benzylphenyl gamma-dimethylamino-beta,beta-dimethylpropyl ether

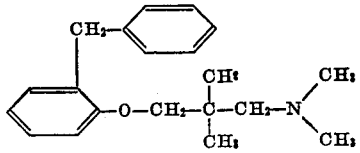

A suspension of 37.2 grams (0.2 mole) of gamma-dimethylamino-beta,beta-dimethylpropyl chloride hydrochloride in 50 ml. of toluene is stirred with 25 ml. of 56% potassium hydroxide until the hydrochloride is completely decomposed. The toluene layer is decanted and the aqueous slurry stirred with three 50-ml. portions of fresh toluene. The combined toluene decantates are dried by shaking over anhydrous potassium carbonate. A solution of 36.8 grams (0.2 mole) of 2-benzylphenol in 200 ml. of toluene is added dropwise to a stirred suspension of 4.8 grams (0.2 mole) of sodium hydride in 100 ml. of toluene. The mixture is refluxed for an hour to insure complete conversion of the 2-benzylphenol to its sodium salt. To this clear hot solution is added dropwise the above-mentioned toluene solution of gamma-dimethylamino-beta,beta-dimethylpropyl chloride. The reaction mixture is then stirred and refluxed overnight. To the cooled mixture is added enough water to dissolve the precipitated sodium chloride; the resulting water layer is discarded. The toluene layer is extracted in turn with 20% sodium hydroxide, Claisen's alkali, water, saturated sodium chloride and filtered through anhydrous sodium sulfate. The filtrate is stripped and the residual oil distilled in vacuo. There is obtained 53.2 grams (94% yield) of 2-benzylphenyl-gamma-dimethylamino-beta,beta-dimethylpropyl ether, B. P. 160–161°/2 mm., $n_D^{26}$ 1.5362.
Analysis:

|   | Calcd. for $C_{20}H_{27}ON$ | Found |
|---|---|---|
| C | 80.8 | 81.0 |
| H | 9.2 | 9.0 |

EXAMPLE 54

2-benzylphenyl gamma-1-piperidyl-beta,beta-dimethylpropyl ether

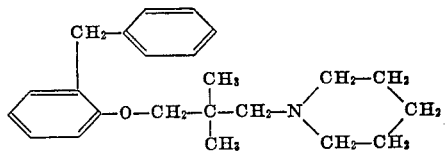

In the manner described in Example 53, by using 2-benzylphenol and gamma-1-piperidyl-beta,beta-dimethylpropyl chloride hydrochloride, there is obtained 2-benzylphenyl gamma-1-piperidyl-beta,beta-dimethylpropyl ether (92% yield), B. P. 171–174° 1 mm., $n_D^{24}$ 1.5433.

Analysis:

|   | Calcd. for $C_{21}H_{21}ON$ | Found |
|---|---|---|
| C | 81.8 | 82.2 |
| H | 9.3 | 9.3 |

EXAMPLE 55
*2-benzylphenyl beta-cyclohexylaminoethyl ether*

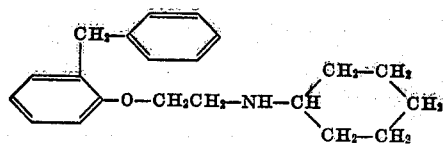

In the manner described in Example 53, by using 2-benzylphenol and beta-cyclohexylaminoethyl chloride hydrochloride, there is obtained 2-benzylphenyl beta-cyclohexylaminoethyl ether (35% yield), B. P. 165–171°/1 mm.
Hydrochloride: M. P. 182.0–183.5° (recrystallized from isopropyl alcohol).
Analysis:

|   | Calcd. for $C_{21}H_{28}ONCl$ | Found |
|---|---|---|
| C | 72.9 | 73.3 |
| H | 8.2 | 8.3 |

EXAMPLE 56
*2-benzylphenyl gamma-di-n-butylaminopropyl ether*

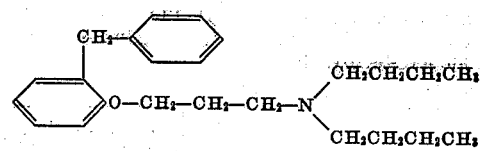

In the manner described in Example 53, by using 2-benzylphenol and gamma-di-n-butylaminopropyl chloride hydrochloride, there is obtained 2-benzylphenyl gamma-di-n-butylaminopropyl ether (98% yield), B. P. 174–176°/1 mm. Hydrochloride: M. P. 86.0–89.0° (recrystallized from ethyl acetate).
Analysis:

|   | Calcd. for $C_{24}H_{36}ONCl$ | Found |
|---|---|---|
| C | 74.1 | 74.2 |
| H | 9.3 | 9.5 |

EXAMPLE 57
*2-benzylphenyl gamma-1-piperidylpropyl ether*

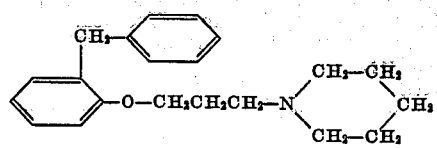

2-benzylphenyl gamma-bromopropyl ether, which may be prepared by reacting sodium 2-benzylphenoxide with 1,3-dibromopropane, and a large excess of piperidine are heated together on the steam bath overnight. The reaction mixture is diluted with ether and the piperidine hydrobromide removed by filtration or by washing with water. The ether solution is extracted with dilute hydrochloric acid. The acid extracts are basified with sodium hydroxide and the liberated basic ether extracted into ether. The combined ether extracts are dried and stripped. Distillation of the residual oil gives 2-benzylphenyl gamma-1-piperidylpropyl ether (68% yield), B. P. 192–198°/1 mm. Hydrochloride: M. P. 167.0–168.0° (recrystallized from isopropyl alcohol).

Analysis:

|   | Calcd. for $C_{21}H_{28}ONCl$ | Found |
|---|---|---|
| C | 73.0 | 72.9 |
| H | 8.2 | 8.3 |

EXAMPLE 58
*2-benzylphenyl gamma-1-(2-methylpiperidyl)propyl ether*

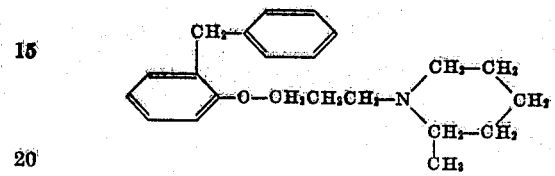

In the manner described in Example 57, by using 2-benzylphenyl gamma-bromopropyl ether and 2-methylpiperidine, there is obtained 2-benzylphenyl gamma-1-(2-methylpiperidyl)propyl ether (66% yield), B. P. 194–197°/1 mm. Hydrochloride: M. P. 149.0–150.0° (recrystallized from isopropyl alcohol).
Analysis:

|   | Calcd. for $C_{22}H_{30}ONCl$ | Found |
|---|---|---|
| C | 73.6 | 73.7 |
| H | 8.4 | 8.5 |

EXAMPLE 59
*2-benzylphenyl gamma-dimethylaminopropyl ether*

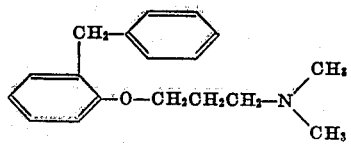

In the manner described in Example 57, by using 2-benzyl gamma-bromopropyl ether and dimethylamine, there is obtained 2-benzylphenyl gamma-dimethylaminopropyl ether (87% yield), B. P. 149–153°/1 mm. Hydrochloride: M. P. 159–160°.
Analysis:

|   | Calcd. for $C_{18}H_{24}ONCl$ | Found |
|---|---|---|
| C | 70.8 | 70.6 |
| H | 7.9 | 7.8 |

EXAMPLE 60
*2-benzylphenyl beta-1-pyrrolidylethyl ether*

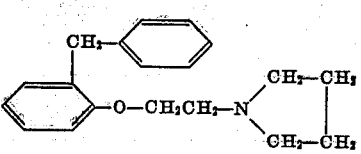

In the manner described in Example 57, by using 2-benzylphenyl beta-bromoethyl ether and pyrrolidine, there is obtained 2-benzylphenyl beta-1-pyrrolidylether (74% yield), B. P. 152–163°/1 mm. Hydrochloride: M. P. 140.0–141.5° (recrystallized from acetone).
Analysis:

|   | Calcd. for $C_{19}H_{24}ONCl$ | Found |
|---|---|---|
| C | 72.1 | 72.1 |
| H | 7.6 | 7.7 |

EXAMPLE 61

*2-benzylphenyl beta-1-(2-methylpiperidyl)ethyl ether*

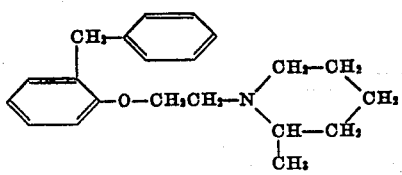

In the manner described in Example 57, by using 2-benzylphenyl beta-bromoethyl ether and 2-methylpiperidine, there is obtained 2-benzylphenyl beta-1-(2-methylpiperidyl)ethyl ether (76% yield), B. P. 151–167°/1 mm. Hydrochloride: M. P. 139.5–142.0° (recrystallized from methyl isobutyl ketone).
Analysis:

|   | Calcd. for $C_{21}H_{29}ONCl$ | Found |
|---|---|---|
| C | 72.8 | 73.3 |
| H | 8.4 | 8.3 |

EXAMPLE 62

*4-benzylphenyl gamma-di-n-butylaminopropyl ether*

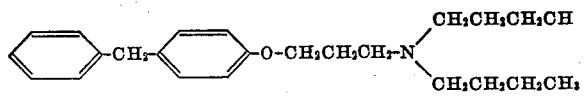

In the manner described in Example 53, by using 4-benzylphenol and gamma-di-n-butylaminopropyl chloride hydrochloride, there is obtained 4-benzylphenyl gamma-di-n-butylaminopropyl ether (75% yield), B. P. 197–200°/1 mm. Hydrochloride: M. P. 960.0–98.0° (recrystallized from ethyl acetate).
Analysis:

|   | Calcd. for $C_{26}H_{40}ONCl$ | Found |
|---|---|---|
| C | 74.1 | 73.6 |
| H | 9.3 | 9.4 |

EXAMPLE 63

*4-chloro-2-benzylphenyl beta-diethylaminoethyl ether*

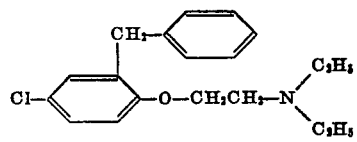

In like manner to Example 53, by using 4-chloro-2-benzylphenol and beta-diethylaminoethyl chloride hydrochloride, there is obtained 4-chloro-2-benzylphenyl beta-diethylaminoethyl ether, B. P. 175–188°/1 mm.
Analysis:

|   | Calcd. for $C_{19}H_{24}ONCl$ | Found |
|---|---|---|
| C | 71.8 | 71.8 |
| H | 7.6 | 7.5 |

Dihydrogen citrate: M. P. 141.5–142.0° (recrystallized from methanol).
Analysis:

|   | Calcd. for $C_{25}H_{32}O_8NCl$ | Found |
|---|---|---|
| C | 58.9 | 58.8 |
| H | 6.3 | 6.4 |

EXAMPLE 64

*2-(4'-fluorobenzyl)phenyl beta-dimethylaminoethyl ether*

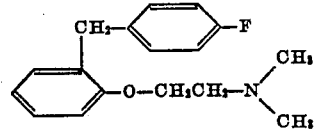

In the manner described in Example 53, by using 2-(4'-fluorobenzyl)phenol, which may be prepared by reacting sodium phenoxide with 4-fluorobenzyl chloride, and beta-dimethylaminoethyl chloride hydrochloride, there is obtained 2-(4'-fluorobenzylphenyl beta-dimethylaminoethyl ether (72% yield), B. P. 140–146°/2 mm. Hydrochloride: M. P. 131.0–132.5° (recrystallized from isopropyl-Skellysolve B).
Analysis:

|   | Calcd. for $C_{17}H_{20}ONClF$ | Found |
|---|---|---|
| C | 65.9 | 65.7 |
| H | 6.8 | 6.9 |

EXAMPLE 65

*4-fluoro-2-benzylphenyl beta-dimethylaminoethyl ether*

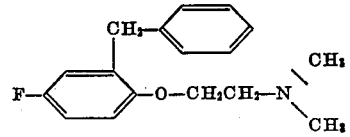

In the manner described in Example 53, by using 4-fluoro-2-benzylphenol, which may be prepared by reacting benzyl chloride with sodium 4-fluorophenoxide, and beta-dimethylaminoethyl chloride hydrochloride, there is obtained 4-fluoro-2-benzylphenyl beta-dimethylaminoethyl ether (89% yield), B. P. 131–134°/1 mm. Hydrochloride: M. P. 124.5–125.5° (recrystallized from isopropyl alcohol-Skellysolve B).
Analysis:

|   | Calcd. for $C_{17}H_{21}ONClF$ | Found |
|---|---|---|
| C | 65.9 | 65.7 |
| H | 6.8 | 6.8 |
| N | 4.5 | 4.9 |

EXAMPLE 66

*4-bromo-2-benzylphenyl beta-dimethylaminoethyl ether*

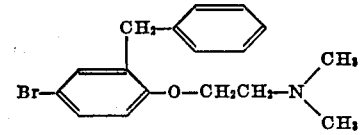

In the manner described in Example 53, by using 4-bromo-2-benzylphenol and beta-dimethylaminoethyl chloride hydrochloride, there is obtained 4-bromo-2-benzylphenyl beta-dimethylaminoethyl ether (89% yield), B. P. 164–167°/1.5 mm. Hydrochloride: M. P. 179.5–181.0° (recrystallized from isopropyl alcohol-Skellysolve B).
Analysis:

|   | Calcd. for $C_{17}H_{21}ONBrCl$ | Found |
|---|---|---|
| C | 55.1 | 55.7 |
| H | 5.7 | 5.7 |
| N | 3.8 | 3.8 |

EXAMPLE 67

*4-iodo-2-benzylphenyl beta-dimethylaminoethyl ether*

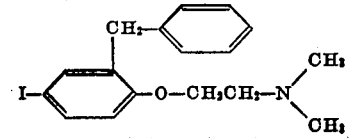

In the manner described in Example 53, by using 4-iodo-2-benzyl phenol, which may be prepared by reacting benzyl chloride with sodium 4-iodophenoxide, and beta-dimethylaminoethyl chloride hydrochloride, there is obtained 4-iodo-2-benzylphenyl beta-dimethylaminoethyl ether. Hydrochloride: M. P. 167.0–170.0° (recrystallized from methyl isobutyl ketone).
Analysis:

|   | Calcd. for C₁₇H₂₁ONCII | Found |
|---|---|---|
| C | 48.9 | 49. |
| H | 5.1 | 5.1 |

EXAMPLE 68

6-methoxy-2-benzylphenyl beta-dimethylaminoethyl ether

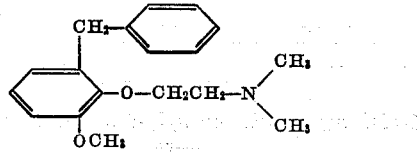

In the manner described in Example 53, by using 6-methoxy-2-benzylphenol and beta-dimethylaminoethyl-chloride hydrochloride, there is obtained 6-methoxy-2-benzylphenyl beta-dimethylaminoethyl ether (83% yield), B. P. 144–148°/1 mm. Nitrate: M. P. 92.5–94.0° (recrystallized from isopropyl alcohol-Skellysolve B).
Analysis:

|   | Calcd. for C₁₈H₂₄O₅N₂ | Found |
|---|---|---|
| C | 62.1 | 61.8 |
| H | 6.9 | 7.1 |

EXAMPLE 69

4-dimethylamino-2-benzylphenyl beta-dimethylaminoethyl ether

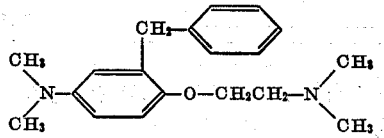

In the manner described in Example 53, by using 4-dimethylamino-2-benzylphenol, which may be prepared by reacting benzyl chloride with sodium 4-dimethylaminophenoxide, and beta-dimethylaminoethyl chloride hydrochloride, there is obtained 4-dimethylamino-2-benzylphenyl beta-dimethylaminoethyl ether 73% yield), B. P. 171–186°/1 mm. Monohydrochloride: M. P. 154.0–156.0° (recrystallized from isopropyl alcohol).
Analysis:

|   | Calcd. for C₁₉H₂₇ON₂Cl | Found |
|---|---|---|
| C | 68.1 | 67.9 |
| H | 8.1 | 8.1 |
| N | 8.4 | 8.8 |

EXAMPLE 70

2-(alpha-methylbenzyl)phenyl beta-dimethylaminoethyl ether

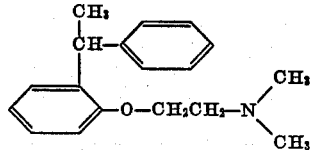

In the manner described in Example 53, by using 2-(alpha-methylbenzyl)phenol, which may be prepared by reacting alpha-bromoethylbenzene with sodium phenoxide, and beta-dimethylaminoethyl chloride hydrochloride, there is obtained 2-(alpha-methylbenzyl)phenyl beta-dimethylaminoethyl ether (78% yield), B. P. 142–146°/1 mm. Hydrochloride: M.P. 141.0–142.5° (recrystallized from isopropyl alcohol-Skellysolve B).
Analysis:

|   | Calcd. for C₁₈H₂₄ONCl | Found |
|---|---|---|
| C | 70.7 | 70.7 |
| H | 7.9 | 8.1 |
| N | 4.6 | 4.3 |

EXAMPLE 71

2-(3′-thenyl)phenyl beta-dimethylaminoethyl ether

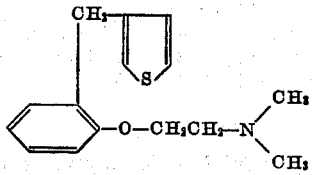

In the manner described in Example 53, by using 2-(3′-thenyl)phenyl, which may be prepared by reacting 3-thenylbromide with sodium phenoxide, and beta-dimethylaminoethyl chloride hydrochloride, there is obtained 2-(3′-thenyl)phenyl beta-dimethylaminoethyl ether (78% yield), B. P. 156–155°/2 mm. Dihydrogen citrate: M. P. 136.0–137.5° (recrystallized from methanol-ether.)
Analysis:

|   | Calcd. for C₂₁H₂₇O₈NS | Found |
|---|---|---|
| C | 55.6 | 55.6 |
| H | 6.0 | 6.1 |

EXAMPLE 72

2-(2′-pyridylmethyl)phenyl beta-dimethylaminoethyl ether

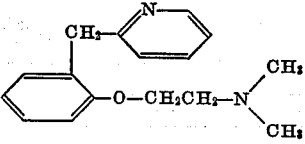

To a solution of 6.5 grams 2-(2′-pyridylmethyl)phenol in 95 ml. of toluene is added 1.5 grams of flake sodium hydroxide. The mixture is stirred and refluxed until the theoretical amount of water (0.6 ml.) has been caught in a Dean-Stark trap. A solution of beta-dimethylaminoethyl chloride in toluene is prepared by treating a toluene suspension of 10.7 grams of beta-dimethylaminoethyl chloride hydrochloride with an excess of 50% sodium hydroxide. The toluene solution is dried over anhydrous potassium carbonate, filtered and added dropwise to the above described solution of sodium 2-(2′-pyridylmethyl) phenoxide. The reaction mixture is then refluxed overnight. The mixture is cooled, extracted several times with water, and the toluene solution dried over potassium carbonate. Distillation gives 4.2 grams (46% yield) of 2 - (2′ - pyridylmethyl)phenyl beta-dimethylaminoethyl ether, B. P. 159–161 at less than 1 mm.
Analysis:

|   | Calcd. for C₁₆H₂₀ON₂ | Found |
|---|---|---|
| C | 74.9 | 74.3 |
| H | 7.8 | 8.1 |

Hydrogen citrate: M. P. 149.0–150.0° (dec.).
Analysis:

|   | Calcd. for C₂₂H₂₈O₈N₂ | Found |
|---|---|---|
| C | 58.8 | 58.5 |
| H | 6.3 | 6.4 |

EXAMPLE 73

*2-(2'-furfuryl)phenyl beta-dimethylaminoethyl ether*

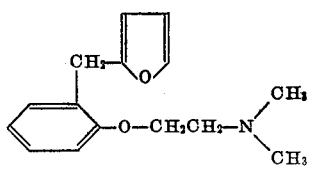

In the manner described in Example 53, by using 2-(2'-furfuryl)phenol, which may be prepared by reacting 2-furfuryl bromide with sodium phenoxide, and beta-dimethylaminoethyl chloride hydrochloride, there is obtained 2-(2'-furfuryl)phenyl beta-dimethylaminoethyl ether.

EXAMPLE 74

*7-benzyl-8-quinolyl beta-dimethylaminoethyl ether*

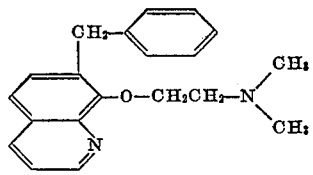

In the manner described in Example 53, by using 7-benzyl-8-hydroxyquinoline, which may be prepared by reacting benzyl chloride with the sodium salt of 8-hydroxyquinoline, and beta-dimethylaminoethyl chloride hydrochloride, there is obtained 7-benzyl-8-quinolyl beta-dimethylaminoethyl ether (86% yield), B. P. 190–197°/1 mm. Dihydrochloride. M. P. 205.0–207.0° (recrystallized from methanol-ether).
Analysis:

|   | Calcd. for $C_{20}H_{24}ON_2Cl_2$ | Found |
|---|---|---|
| C | 63.0 | 63.0 |
| H | 6.4 | 6.2 |
| N | 7.4 | 7.4 |

EXAMPLE 75

*2-(2-benzylphenoxymethyl)tetrahydropyrimidine*

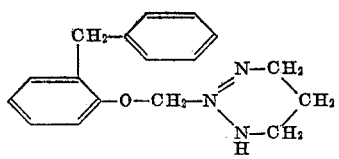

Forty grams (0.15 mole) of ethyl 2-benzylphenoxyacetate, which may be prepared by reacting ethyl chloroacetate with sodium 2-benzylphenoxide according to the method disclosed in the copending application Serial Number 128,028, filed November 17, 1949, and 22.2 grams (0.3 mole) of 1,3-diamino-propane are heated together on the steam bath for 48 hours. Distillation of the reaction mixture gives 26.4 grams (63% yield) of 2-(2-benzylphenoxymethyl)tetrahydropyrimidine, B. P. 194–197°/2.5 mm. Hydrochloride: M. P. 176.5–177.5° (recrystallized from isopropyl alcohol-ether).
Analysis:

|   | Calcd. for $C_{18}H_{21}ON_2Cl$ | Found |
|---|---|---|
| C | 68.2 | 68.3 |
| H | 6.7 | 7.0 |
| N | 8.8 | 8.9 |

EXAMPLE 76

*1-Allyl-2-naphthyl beta-dimethylaminoethyl ether*

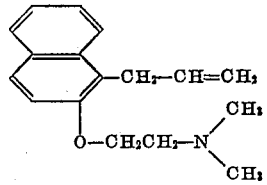

B. P. 139–143°/1 mm. Hydrochloride: M. P. 151.0–152.5°.
Analysis:

|   | Calcd. for $C_{17}H_{22}ONCl$ | Found |
|---|---|---|
| C | 70.0 | 70.2 |
| H | 7.6 | 7.9 |

EXAMPLE 77

*2-(2-benzylphenoxymethyl)-4(5)-methylimidazoline*

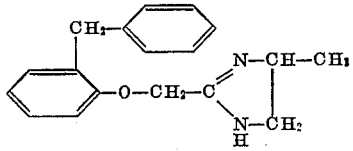

Forty grams of ethyl 2-benzylphenoxyacetate and 39 grams of 85% 1,2-propylenediamine are heated together for seven hours, distilling off alcohol and water as formed during this time. Distillation of the reaction mixture in vacuo gives 31.6 grams (75% yield) of 2-(2-benzylphenoxymethyl)-4(5)-methylimidazoline, B. P. 190–196°/1.5 mm.
Analysis:

|   | Calcd. for $C_{18}H_{20}ON_2$ | Found |
|---|---|---|
| C | 77.1 | 77.6 |
| H | 7.2 | 6.9 |

Hydrochloride: M. P. 186.5–187.5° (recrystallized from isopropanol).
Analysis:

|   | Calcd. for $C_{18}H_{21}ON_2Cl$ | Found |
|---|---|---|
| C | 68.2 | 68.3 |
| H | 6.7 | 7.0 |

EXAMPLE 78

*Beta-(o-benzylphenoxy)ethyl trimethylammonium iodide*

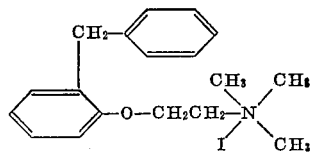

To a solution of 30 grams of N,N-dimethyl-beta-(o-benzylphenoxy)ethylamine in 70 ml. of isopropyl alcohol is added, with cooling, 18.3 grams of methyl iodide. The solid which precipitates at once is collected by filtration and recrystallized from water, giving 46.5 grams (99% yield) of beta-(o-benzylphenoxy)ethyl trimethylammonium iodide, M. P. 161.0–162.0°.
Analysis:

|   | Calcd. for $C_{18}H_{24}ONI$ | Found |
|---|---|---|
| C | 54.5 | 54.1 |
| H | 6.1 | 5.8 |

EXAMPLE 79

*Beta-(o-benzylphenoxy)ethyl ethyl dimethylammonium iodide*

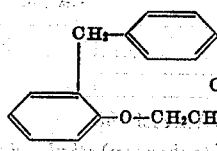

To a solution of 25.5 grams of N,N-dimethyl beta-(o-benzyl-phenoxy)ethyl amine in 100 ml. of isopropyl alcohol is added 20 grams of ethyl iodide. The following day the crystalline product is filtered off and recrystallized from ethyl alcohol, giving 29.7 grams (72% yield) of beta-(o-benzylphenoxy)ethyl ethyl dimethylammonium iodide, M. P. 156.5–158.0°.

Analysis:

|  | Calcd. for $C_{19}H_{26}ONI$ | Found |
|---|---|---|
| C | 55.6 | 55.7 |
| H | 6.4 | 6.5 |

EXAMPLE 80

*Beta-(o-benzylphenoxy)ethyl dimethyl benzohydryl-ammonium bromide*

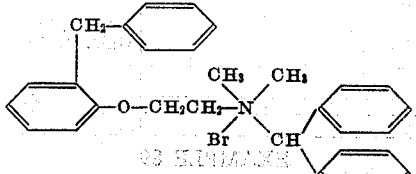

A solution of 25.5 grams of N,N-dimethyl beta-(o-benzylphenoxy) ethylamine and 24.7 grams of benzohydryl bromide in 150 ml. of acetone is heated at reflux for 20 hours, then most of the acetone is distilled off under reduced pressure. Ether is added to the residue, and crystallization is induced by cooling and scratching. The beta-(o-benzylphenoxy)ethyl dimethyl benzohydryl bromide thus obtained weighs 45.2 grams (90% yield) and melts at 67.0–70.0°.

Analysis:

|  | Calcd. for $C_{30}H_{32}ONBr.H_2O$ | Found |
|---|---|---|
| C | 69.3 | 69.7 |
| H | 6.6 | 6.5 |

EXAMPLE 81

*Beta-(o-benzylphenoxy)ethyl trimethylammonium methylsulfate*

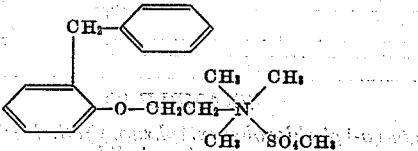

A solution of 12.7 grams of N,N-dimethyl beta-(o-benzylphenoxy) ethylamine and 7.5 grams of dimethylsulphate in 50 ml. of acetone is allowed to stand for two days at room temperature, then diluted with ether. The only quaternary crystallizes on cooling, and is recrystallized, first from isopropyl alcohol, then from acetone, to give 6.6 grams (35% yield) of beta-(o-benzylphenoxy)ethyl trimethylammonium methylsulfate, M. P. 93.0–98.0°. The compound is very hygroscopic.

Analysis:

|  | Calcd. for $C_{19}H_{27}O_4NS$ | Found |
|---|---|---|
| C | 59.8 | 59.8 |
| H | 7.1 | 7.3 |

EXAMPLE 82

*Beta-(o-benzylphenoxy)ethyl trimethylammonium p-toluenesulfonate*

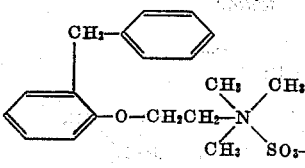

A solution of 12.7 grams of N,N-dimethyl beta-(o-benzylphenoxy) ethyl amine and 10.2 grams of methyl p-toluene sulfonate in 300 ml. of acetone is allowed to stand a short time at room temperature, then diluted with ether. The oil which separates soon crystallizes, and is collected by filtration. There is obtained on recrystallization from ethyl acetate 19.8 grams (90% yield) of beta-(o-benzylphenoxy)ethyl trimethylammonium p-toluenesulfonate, M. P. 70.0–80.0°. The compound is very hygroscopic.

Analysis:

|  | Calcd. for $C_{25}H_{31}O_4NS.\frac{1}{2}H_2O$ | Found |
|---|---|---|
| C | 66.8 | 67.3 |
| H | 7.2 | 7.5 |

EXAMPLE 83

*Beta-(o-benzylphenoxy)ethyl triethylammonium iodide*

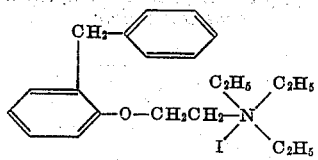

A solution of 28.3 grams of N,N-diethyl beta-(o-benzylphenoxy) ethylamine and 18.7 grams of ethyl iodide in 100 ml. of isopropyl alcohol is refluxed for 24 hours, then evaporated to dryness under reduced pressure. The residue, which crystallized on scratching, is recrystallized from ethyl alcohol, giving 33.2 grams (76% yield) of beta-(o-benzylphenoxy)ethyl triethylammonium iodide, M. P. 161.5–162.5°.

Analysis:

|  | Calcd. for $C_{21}H_{30}ONI$ | Found |
|---|---|---|
| C | 57.4 | 58.0 |
| H | 6.9 | 7.1 |

EXAMPLE 84

*Beta-(o-benzylphenoxy)ethyl methyl diethylammonium iodide*

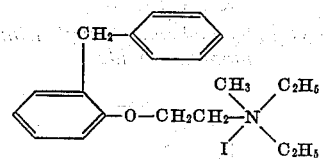

A solution of 28.3 grams of N,N-diethyl beta-(o-benzylphenoxy) ethylamine and 17.0 grams of methyl iodide in 100 ml. of isopropyl alcohol is allowed to stand 18 hours at 5°. The precipitated quaternary is collected by filtration and recrystallized from ethyl alcohol. There is obtained in this manner 40.7 grams (96% yield) of beta-(o-benzylphenoxy)ethyl methyl diethylammonium iodide, M. P. 138.5–140.0°.

Analysis:

|  | Calcd. for $C_{20}H_{28}ONI$ | Found |
|---|---|---|
| C | 56.5 | 56.4 |
| H | 6.6 | 6.8 |

EXAMPLE 85

*Beta-(o-benzyl-p-cresoxy)ethyl trimethylammonium iodide*

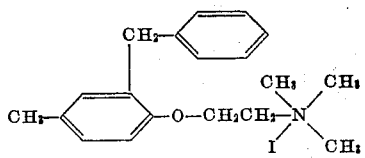

To a solution of 8.1 grams of N,N-dimethyl beta-(o-benzyl-p-cresoxy)ethylamine in 30 ml. of isopropyl alcohol is added 4.8 grams of methyl iodide. The solution becomes warm, and on cooling an oil separates, which slowly crystallizes. The solid is collected by filtration and recrystallized from methyl isobutyl ketone to give 10.5 grams (85% yield) of beta-(o-benzyl-p-cresoxy)ethyl trimethylammonium iodide, M. P. 138.0–142.0°.

Analysis:

|   | Calcd. for $C_{19}H_{26}ONI$ | Found |
|---|---|---|
| C | 55.5 | 55.5 |
| H | 6.4 | 6.5 |

EXAMPLE 86

*Beta-(o-benzyl-p-ethoxyphenoxy)ethyl trimethylammonium iodide*

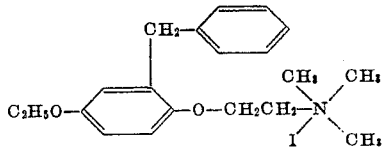

To a solution of 12.0 grams of N,N-dimethyl beta-(o-benzyl-p-ethoxyphenoxy)ethylamine in 40 ml. of isopropyl alcohol is added 6.3 grams of methyl iodide. Cooling and scratching induces crystallization. The solid is collected by filtration and recrystallized from methyl isobutyl ketone. There is obtained 10.5 grams (60% yield) of beta-(o-benzyl-p-ethoxyphenoxy)ethyl trimethylammonium iodide, M. P. 139.0–145.0°.

Analysis:

|   | Calcd. for $C_{20}H_{28}O_2NI$ | Found |
|---|---|---|
| C | 54.4 | 54.3 |
| H | 6.4 | 6.4 |

EXAMPLE 87

*Beta-(o-benzyl-p-chlorophenoxy)ethyl trimethylammonium iodide*

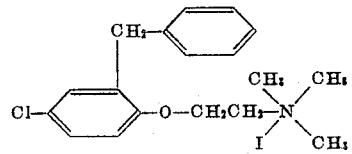

An aqueous solution of 6.2 grams of N,N-dimethyl beta-(o-benzyl-p-chlorophenoxy)ethylamine hydrochloride is made basic with sodium hydroxide and the liberated aminoether extracted into ether. The ether solution is dried over anhydrous potassium carbonate, filtered and the filtrate evaporated to dryness. The residual oil is taken up in 80 ml. of isopropyl alcohol and 3.1 grams of methyl iodide added thereto. Crystallization begins in a short time. The solid is filtered off and recrystallized from ethyl alcohol to give 6.8 grams (83% yield) of beta-(o-benzyl-p-chlorophenoxy)ethyl trimethylammonium iodide, M. P. 163.0–164.0°.

Analysis:

|   | Calcd. for $C_{18}H_{23}ONClI$ | Found |
|---|---|---|
| C | 50.0 | 50.4 |
| H | 5.4 | 5.6 |

EXAMPLE 88

*Beta-(o-benzyl-p-bromophenoxy)ethyl trimethylammonium iodide*

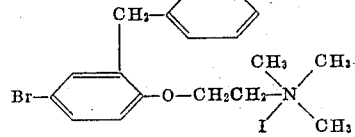

To a solution of 10.6 grams of N,N-dimethyl beta-(o-benzyl-p-bromophenoxy)ethylamine in 30 ml. of isopropyl alcohol is added 4.7 grams of methyl iodide. The solution becomes warm, and on cooling, an oil separates, which slowly crystallizes. When crystallization is complete, the solid is collected by filtration and recrystallized from isopropyl alcohol. There is obtained 13.6 grams (95% yield) of beta-(o-benzyl-p-bromophenoxy)ethyl trimethylammonium iodide, M. P. 150.0–153.0°.

Analysis:

|   | Calcd. for $C_{18}H_{23}ONBrI$ | Found |
|---|---|---|
| C | 45.4 | 45.5 |
| H | 4.9 | 5.0 |

EXAMPLE 89

*Beta-(o-benzyl-p-fluorophenoxy)ethyl trimethylammonium iodide*

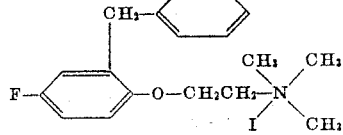

To a solution of 5.5 grams of N,N-dimethyl beta-(o-benzyl-p-fluorophenoxy)ethylamine in 20 ml. of isopropyl alcohol is added 3.1 grams of methyl iodide. An exothermic reaction occurs, and an oil separates as the solution cools. The oil soon crystallizes and is filtered off. Recrystallization from dilute isopropyl alcohol gives 7.8 grams (94% yield) of beta-(o-benzyl-p-fluorophenoxy)ethyl trimethylammonium iodide, M. P. 198.0–200.0°.

Analysis:

|   | Calcd. for $C_{18}H_{23}ONFI$ | Found |
|---|---|---|
| C | 52.0 | 52.4 |
| H | 5.6 | 5.9 |

EXAMPLE 90

*Beta-(o-[p'-chlorobenzyl]phenoxy)ethyl trimethylammonium iodide*

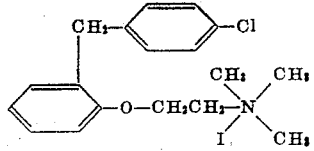

An aqueous solution of 17.5 grams of N,N-dimethyl beta-(o-[p'-chlorobenzyl]phenoxy)ethylamine hydrochloride is made basic with sodium hydroxide and the liberated aminoether extracted into ether. The ether solution is dried over anhydrous potassium carbonate, filtered and the filtrate evaporated to dryness. The residual oil is taken up in 130 ml. of isopropyl alcohol and to this solution is added 9.4 grams of methyl iodide. After a short time, crystallization is complete, and the solid is collected by filtration. There is obtained on recrystallization from ethyl alcohol 19.9 grams (86% yield) of beta-(o-[p'-chlorobenzyl]phenoxy)ethyl trimethylammonium iodide, M. P. 163.0-164.0°.
Analysis:

|   | Calcd. for $C_{18}H_{23}ONClI$ | Found |
|---|---|---|
| C | 50.0 | 50.3 |
| H | 5.4 | 5.5 |

EXAMPLE 91

Beta-(o-[p'-fluorobenzyl]phenoxy)ethyl trimethylammonium iodide

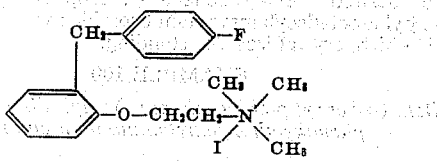

To a solution of 5.5 grams of N,N-dimethyl beta-(o-[p'-fluorobenzyl]phenoxy)ethylamine in 20 ml. of isopropyl alcohol is added 3.1 grams of methyl iodide. An exothermic reaction occurs, and as the reaction mixture cools, an oil separates. This oil slowly crystallizes, and the solid is collected by filtration. It is recrystallized from dilute isopropyl alcohol, giving 7.9 grams (95% yield) of beta-(o-[p'-fluorobenzyl]phenoxy)ethyl trimethylammonium iodide, M. P. 155.5-157.0°.
Analysis:

|   | Calcd. for $C_{18}H_{23}ONFI$ | Found |
|---|---|---|
| C | 52.0 | 51.8 |
| H | 5.6 | 5.8 |

EXAMPLE 92

Beta-(o-benzyl-p-chlorophenoxy)ethyl methyl diethylammonium iodide

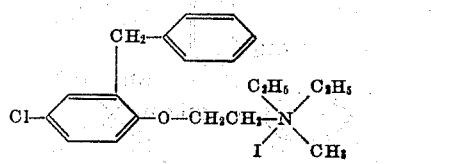

To a solution of 15.8 grams of N,N-diethyl beta-(o-benzyl-p-chlorophenoxy)ethylamine in 50 ml. of isopropyl alcohol is added 10.0 grams of methyl iodide. The solution is heated to reflux, filtered and allowed to cool. The precipitated solid is collected by filtration and recrystallized from isopropyl alcohol, giving 18.4 grams (80% yield) of beta-(o-benzyl-p-chloro-phenoxy)ethyl methyl diethyl ammonium iodide, M. P. 149.0-150.5°.
Analysis:

|   | Calcd. for $C_{20}H_{27}ONClI$ | Found |
|---|---|---|
| C | 52.3 | 52.4 |
| H | 5.9 | 5.9 |

EXAMPLE 93

Beta-(o-benzyl-p-chlorophenoxy)ethyl triethylammonium iodide

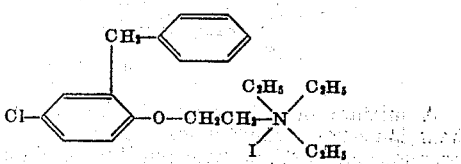

A solution of 15.8 grams of N,N-diethyl beta-(o-benzyl-p-chlorophenoxy)ethylamine and 11.0 grams of ethyl iodide in 50 ml. of isopropyl alcohol is refluxed for four hours, filtered and cooled. The precipitated solid is collected by filtration and recrystallized from acetone-isopropyl alcohol. There is obtained 10.0 grams (42% yield) of beta-(o-benzyl-p-chloro-phenoxy)ethyl triethylammonium iodide, M. P. 156.5-157.5°.
Analysis:

|   | Calcd. for $C_{21}H_{29}ONClI$ | Found |
|---|---|---|
| C | 53.2 | 53.4 |
| H | 6.2 | 6.2 |

EXAMPLE 94

Gamma-(o-benzylphenoxy)-beta,beta-dimethylpropyl trimethylammonium iodide

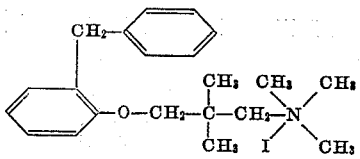

To a solution of 11.9 grams of N,N-dimethyl gamma-(o-benzylphenoxy)-beta,beta-dimethylpropylamine in 60 ml. of isopropyl alcohol and 5 ml. of water is added 11.4 grams of methyl iodide. The solution is heated to boiling, cooled and diluted with ether. After standing one day at room temperature, the solid is collected by filtration. Recrystallization of the solid from isopropyl alcohol gives 12.3 grams (70% yield) of gamma-(o-benzylphenoxy)-beta,beta-dimethylpropyl trimethylammonium iodide, M. P. 171.5-172.5°.
Analysis:

|   | Calcd. for $C_{21}H_{30}ONI$ | Found |
|---|---|---|
| C | 57.4 | 57.8 |
| H | 6.9 | 7.1 |

EXAMPLE 95

Gamma-(o-benzylphenoxy)propyl trimethylammonium iodide

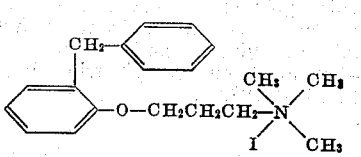

An aqueous solution of 13.0 grams of N,N-dimethyl gamma-(o-benzylphenoxy)propylamine hydrochloride is made basic with sodium hydroxide and the liberated aminoether extracted into ether. The ether solution is dried over anhydrous potassium carbonate, filtered, and the filtrate evaporated to dryness. The residual oil is dissolved in 100 ml. of isopropyl alcohol and to this solution is added 6.6 grams of methyl iodide. The solid quaternary precipitates from the cooled solution in a short time and is collected by filtration. Recrystallization from the water gives 16.1 grams (92% yield) of gamma-(o-benzylphenoxy)propyl trimethylammonium iodide hemihydrate, M. P. 186.0-187.0°.
Analysis:

|   | Calcd. for $C_{19}H_{26}ONI \cdot \frac{1}{2}H_2O$ | Found |
|---|---|---|
| C | 54.3 | 54.6 |
| H | 6.4 | 6.3 |

EXAMPLE 96

Beta-(p-benzylphenoxy)ethyl trimethylammonium iodide

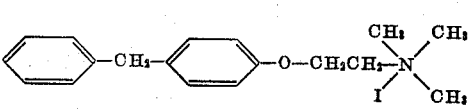

An aqueous solution of 44.7 grams of N,N-dimethyl beta-(p-benzylphenoxy)ethylamine dihydrogen citrate is made basic with sodium hydroxide and the liberated aminoether extracted into ether. The ether solution is dried over anhydrous potassium carbonate, filtered and the filtrate evaporated to dryness. The residual oil (26 grams) is dissolved in 100 ml. of isopropyl alcohol and 17 grams of methyl iodide added thereto. The mixture is chilled and the precipitated solid collected by filtration. Recrystallization of the crude solid from acetone gives 22.0 grams (55% yield) of beta-(p-benzylphenoxy)-ethyl trimethylammonium iodide, M. P. 150.0–151.5°.

Analysis:

|   | Calcd. for $C_{18}H_{24}ONI$ | Found |
|---|---|---|
| C | 54.5 | 54.6 |
| H | 6.1 | 6.2 |

EXAMPLE 97

Beta-(o-2-thenylphenoxy)ethyl trimethylammonium iodide

To a chilled solution of 26.1 grams of N,N-dimethyl beta-(o-2-thenylphenoxy)ethylamine in 150 ml. of isopropyl alcohol is added 15.6 grams of methyl iodide. The solid which precipitates almost at once is collected by filtration and recrystallized from methyl alcohol. There is obtained in this manner 30.4 grams (75% yield) of beta-(o-2-thenylphenoxy)ethyl trimethylammonium iodide, M. P. 182.0–183.0°.

Analysis:

|   | Calcd. for $C_{16}H_{22}ONIS$ | Found |
|---|---|---|
| C | 47.7 | 47.8 |
| H | 5.5 | 5.6 |

EXAMPLE 98

Beta-(o-benzyl-p-chlorophenoxy)ethyl dimethyl n-octylammonium bromide

A solution of 7.2 grams of N,N-dimethyl beta-(o-benzyl-p-chlorophenoxy)ethylamine and 5.8 grams of n-octyl bromide in 25 ml. of isopropanol is refluxed for 32 hours. Evaporation of the solvent leaves the desired beta-(o-benzyl-p-chlorophenoxy)ethyl dimethyl n-octylammonium bromide as a viscous yellow oil, which crystallizes on trituration with ether. Recrystallization from ethyl acetate-ether gives 10.3 g. of crystalline material, M. P. 122.0–123.0°

Analysis:

|   | Calcd. for $C_{25}H_{37}ONBrCl$ | Found |
|---|---|---|
| C | 62.2 | 62.4 |
| H | 7.7 | 7.8 |

EXAMPLE 99

Beta-(o-benzyl-p-chlorophenoxy)ethyl dimethyl n-octadecylammonium bromide

A solution of 7.2 grams of N,N-dimethyl beta-(o-benzyl-p-chlorophenoxy)ethylamine and 10.0 grams of n-octadecyl bromide in 25 ml. of isopropyl alcohol is refluxed for 24 hours. Evaporation of the solvent leaves the desired beta-(o-benzyl-p-chlorophenoxy)ethyl dimethyl n-octadecylammonium bromide as a viscous yellow oil which crystallizes on standing.

EXAMPLE 100

Beta-(o-benzyl-p-chlorophenoxy)ethyl dimethyl octylphenoxyethoxyethylammonium chloride A solution of 7.2 grams of N,N-dimethyl beta-(o-benzyl-p-chlorophenoxy)ethylamine and 9.4 grams of octylphenoxyethoxyethyl chloride in 25 ml. of isopropanol is refluxed for 40 hours. Evaporation of the solvent leaves the desired beta-(o-benzyl-p-chlorophenoxy)ethyl dimethyl octylphenoxyethoxyethyl ammonium chloride as a viscous light yellow oil.

EXAMPLE 101

Cetyl dimethyl beta-(o-thenylphenoxy)ethylammonium bromide

A mixture of 25.0 grams of N,N-dimethyl beta-(o-thenylphenoxy) ethylamine, 50 grams of cetyl bromide and 25 ml. of benzyl alcohol is heated on the steam bath for 20 hours. Excess halide and solvent are then distilled off at 3 mm. pressure by means of a bath heated to 210°, 28 ml. of distillate being collected. The yellow, viscous, oily product is soluble in ether and acetone and only slightly soluble in water. This product shows strong germicidal activity.

EXAMPLE 102

Beta-(o-benzylphenoxy)ethyl dimethyl n-octadecylammonium bromide

A mixture of 5.4 grams of N,N-dimethyl beta-(o-benzylphenoxy) ethylamine, 7.0 grams of octadecyl bromide and 25 ml. of methanol is refluxed on the steam-bath for six days. Methanol is removed on the steam-bath in a current of air. The residual viscous yellow oil, which is soluble in acetone, ether, and alcohol is only slightly soluble in water. It crystallized from dilute acetone or water. This salt is useful as a germicide.

EXAMPLE 103

*Beta-(o-benzylphenoxy)ethyl dimethyl octylphenoxy-ethoxyethylammonium chloride*

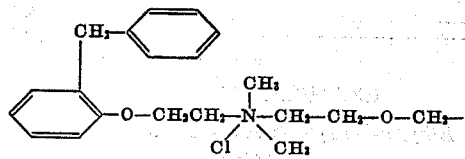

A mixture of 25.5 grams of N,N-dimethyl beta-(o-benzylphenoxy) ethylamine, 50 grams of octylphenoxyethoxyethyl chloride (Rohm and Haas Company) and 25 ml. of benzyl alcohol is heated on the steam-bath for 24 hours. Excess halide and benzyl alcohol are removed by distillation at 2 mm. of Hg pressure by means of a bath heated at 160–200°. The product is a yellow oil which is soluble in ether but only slightly soluble in water.

While the above examples have indicated the method of obtaining the hydrochlorides from the various free base compounds, it is to be understood that the invention contemplates other salts as well, such as sulfates, phosphates, cinnamates, tartrates, ascorbates, sulfamates and other organic and inorganic salts. These may be prepared from the free base in a manner known to art.

EXAMPLE 104

*4-chloro-2-benzylphenyl beta-dimethylaminoethyl ether dihydrogen citrate*

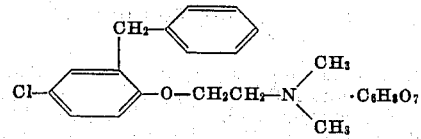

To a well-stirred solution of 218 grams (1.0 mole) of 4-chloro-2-benzylphenol in 750 ml. of toluene is added all at once 46 grams (1.15 moles) of flake sodium hydroxide. The reaction mixture is refluxed until no more water can be removed by means of a Dean-Stark trap. About 1.75 hours are required. A solution of 60 grams (1.5 moles) of sodium hydroxide in 60 ml. of water is added to a cooled slurry of 173 grams (1.2 moles) of beta-dimethylaminoethyl chloride hydrochloride in 200 ml. of toluene. After some ten minutes' stirring, all of the salt has decomposed, and the toluene solution is decanted. The aqueous sludge that remains is extracted in a similar manner with five 80-ml. portions of fresh toluene. The toluene decantates are combined and dried over anhydrous potassium carbonate for two hours. The potassium carbonate is then removed by filtration. Heating of the sodium 4-chloro-2-benzylphenoxide solution is discontinued, the Dean-Stark trap replaced by an ordinary reflux condenser, and the toluene solution of beta-dimethylaminoethyl chloride is added thereto in a slow stream. Following the addition, heating is resumed, and the reaction mixture stirred and refluxed overnight.

Heating is stopped, and a solution of 240 grams (1.25 moles) of anhydrous citric acid in one liter of water is added cautiously to the reaction mixture. Two clear layers result after thorough mixing. The hot solution is transferred to a separatory funnel and the aqueous layer withdrawn as quickly as possible. Crystallization begins almost at once. The solution is cooled and the crude product collected by filtration. Recrystallization from methanol gives 320 grams of 4-chloro-2-benzylphenyl beta-dimethylaminoethyl ether dihydrogen citrate, M. P. 141.5–143.5°.

Analysis:

|   | Calcd. for $C_{21}H_{26}O_8NCl$ | Found |
|---|---|---|
| C | 57.3 | 57.5 |
| H | 5.9 | 5.8 |

EXAMPLE 105

*2-benzylphenyl beta-dimethylaminoethyl ether dihydrogen citrate*

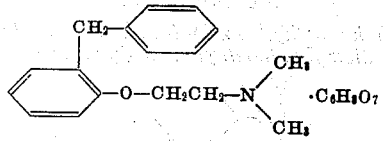

To a well-stirred solution of 184 grams (1.0 mole) of a mixture of approximately equal amounts of 2-benzylphenol and 4-benzylphenol in 650 ml. of toluene is added 46 grams (1.15 moles) of flake sodium hydroxide. The mixture is boiled under reflux until 18 ml. of water has been removed by means of a Dean-Stark trap. Approximately two hours are required to completely remove the water. If desired, the water may be removed by azeotropic distillation with the toluene, provided the toluene thus lost is replaced. The mixture is filtered through a fritted glass funnel of coarse porosity while still hot in order to remove the insoluble sodium 4-benzylphenoxide. Acidification of the sodium 4-benzylphenoxide gives crude 4-benzylphenol, which may be recovered as a by-product.

A suspension of 86.5 grams (0.6 mole) of beta-dimethylaminoethyl chloride hydrochloride in 100 ml. of toluene is cooled in a beaker and a solution of 30 grams (0.75 mole) of sodium hydroxide in 30 ml. of water is added in one portion. The mixture is stirred until all of the salt has decomposed to form a homogeneous paste on the bottom of the beaker. The toluene solution of the basic chloride is removed by decantation. The aqueous paste is extracted by decantation with five 40-ml. portions of toluene. The combined extracts are dried over anhydrous potassium carbonate for at least two hours.

The dark brown toluene solution of sodium 2-benzylphenoxide is placed in a three-necked flask equipped with a mechanical stirrer and a reflux condenser. The toluene solution of the beta-dimethylaminoethyl chloride is filtered and added to the flask in one portion. The stirred mixture is refluxed overnight. To the stirred reaction mixture is added a solution of 135 grams (0.7 mole) of anhydrous citric acid in 350 ml. of water. Heat is evolved and the dihydrogen citrate begins to precipitate in a short time. The mixture is cooled and the crude salt collected by filtration. It may be recrystallized from either water or methanol. One recrystallization from water gives 158 grams of 2-benzylphenyl beta-dimethylaminoethyl ether dihydrogen citrate, M. P. 138.5–139.5°.

Analysis:

|   | Calcd. for $C_{23}H_{29}O_8N$ | Found |
|---|---|---|
| C | 61.8 | 62.1 |
| H | 6.5 | 6.6 |

EXAMPLE 106

*2-(alpha-methylbenzyl)phenyl beta-diethylaminoethyl ether dihydrogen citrate*

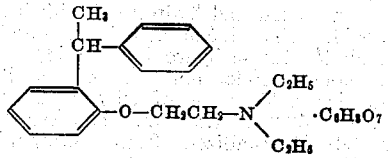

According to the method described in Example 104, there is obtained from 2-(alpha-methylbenzyl)phenol and beta-diethylaminoethyl chloride hydrochloride, 2-(alpha-methylbenzyl)phenyl beta-diethylaminoethyl ether dihydrogen citrate which melts at 126–129°. The salt may be recrystallized from either water or isopropyl alcohol.

Analysis:

|   | Calcd. for $C_{26}H_{35}O_8N$ | Found |
|---|---|---|
| C | 63.8 | 63.5 |
| H | 7.2 | 7.4 |

EXAMPLE 107

*2-(alpha-methylbenzyl)-4-methylphenyl beta-diethylaminoethyl ether dihydrogen*

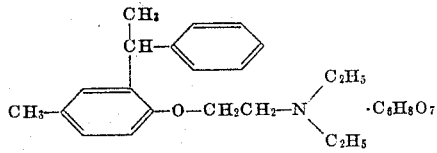

According to the method described in Example 104, there is obtained from 2-(alpha-methylbenzyl)-4-methylphenol, 2-(alpha-methylbenzyl)-4-methylphenyl beta-diethylaminoethyl ether dihydrogen citrate which melts at 125–128°. The salt may be recrystallized from either water or isopropyl alcohol.

EXAMPLE 108

*2-benzylphenyl beta-dimethylaminoethyl ether propionate*

Approximately 4.56 g. of the dihydrogen citrate salt of Example 105 is suspended in 100 ml. of distilled water and 250 ml. of water. The mixture is shaken with an excess of 10% sodium hydroxide solution. The ethereal solution of the basic ether is dried over anhydrous sodium sulfate, then filtered and treated with a solution of 0.74 ml. of propionic acid in 100 ml. of ether. The oily propionate which separates from the cooled solution becomes crystalline when cooled in a bath consisting of solid carbon dioxide and acetone.

EXAMPLE 109

*2-benzylphenyl beta-dimethylaminoethyl ether undecylenate*

A solution of 3.91 g. of 2-benzylphenyl beta-dimethylaminoethyl tartrate in 100 ml. of distilled water is treated with 250 ml. of ether and shaken with an excess of 10% sodium hydroxide solution. The ethereal solution of the basic ether is dried over anhydrous sodium sulfate, then filtered and treated with a solution of 1.84 g. of undecylenic acid in 100 ml. of ether. On cooling the solution, the undecylenate separates as an oil.

EXAMPLE 110

*Ethyl o-benzylphenoxyacetate*

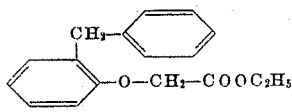

A solution of 184 g. (1.0 mole) of o-benzylphenol in 400 ml. of toluene is added dropwise to a stirred suspension of 24 g. (1.0 mole) of sodium hydride in 200 ml. of toluene, under a nitrogen atmosphere. After the addition has been completed, the mixture is refluxed until all the sodium hydride dissolves. To the clear hot solution is added dropwise 129 grams (1.05 mole) of ethyl chloroacetate; sodium chloride begins to precipitate at once. The reaction mixture is stirred and refluxed overnight, then cooled and hydrolyzed with ice and hydrochloric acid. The toluene layer is separated, washed twice with dilute sodium hydroxide solution, dried with anhydrous sodium sulfate, and stripped. Distillation of the residue gives 244 grams of ethyl o-benzylphenoxy acetate, B. P. 168° at 1.2 mm. The ester solidifies and may be recrystallized from petroleum ether; M. P. 40–44°.

Analysis: Calculated for $C_{17}H_{18}O_3$:

|   | Calculated | Found |
|---|---|---|
| C | 75.5 | 75.7 |
| H | 6.7 | 6.9 |

EXAMPLE 111

*Ethyl o-benzyl-p-cresoxyacetate*

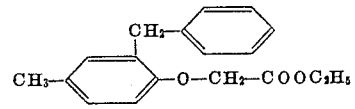

This compound may be prepared in the manner described in Example 110 by using o-benzyl-p-cresol in place of 2-benzylphenol. It boils at 159–162° at 2 mm.; $n^{31}D$—1.5492.

Analysis: Calculated for $C_{18}H_{20}O_3$:

|   | Calculated | Found |
|---|---|---|
| C | 76.0 | 76.5 |
| H | 7.1 | 6.9 |

EXAMPLE 112

*Ethyl-p-chloro-o-benzylphenoxyacetate*

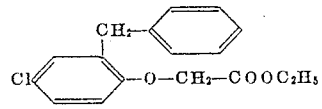

This compound may be prepared in the manner described in Example 110 by using p-chloro-o-benzylphenol in place of o-benzylphenol. It boils at 168–174° at 1 mm. and melts at 67–68° after recrystallization from 95% ethanol.

Analysis: Calculated for $C_{17}H_{17}O_3Cl$:

|   | Calculated | Found |
|---|---|---|
| C | 67.0 | 67.0 |
| H | 5.6 | 5.6 |

EXAMPLE 113

*Ethyl o-(p'-chlorobenzyl)phenoxyacetate*

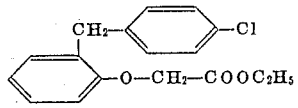

This compound may be prepared in the manner described in Example 110 by using o-(p'-chlorobenzyl)phenol in place of o-benzylphenol. It boils at 162–163° at 1 mm. and melts at 54–58° after recrystallization from petroleum ether.

Analysis: Calculated for $C_{17}H_{17}O_3Cl$:

|   | Calculated | Found |
|---|---|---|
| C | 67.0 | 67.2 |
| H | 5.6 | 5.7 |

EXAMPLE 114

*Ethyl o-(p'-fluorobenzyl)phenoxyacetate*

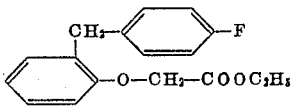

This compound may be prepared in the manner described in Example 110 by using o-(p'-fluorobenzyl)phenol in place of o-benzylphenol. It boils at 153–157°/1.5 mm., $n^{31}D$—1.5362.

Analysis: Calculated for $C_{17}H_{17}O_3F$:

|   | Calculated | Found |
|---|---|---|
| C | 70.8 | 71.0 |
| H | 5.9 | 6.0 |

EXAMPLE 115

2-(o-benzyl-p-cresoxymethyl)imidazoline

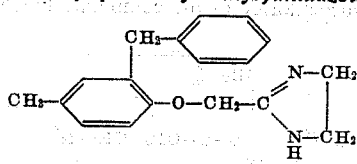

A mixture of 45.5 grams (0.17 mole) of ethyl o-benzyl-p-cresoxyacetate and 28.8 grams (0.48 mole) of anhydrous ethylenediamine is heated for 35 hours on a steam bath in a sealed pressure bottle. Distillation of the reaction mixture gives 33.3 grams of 2-(o-benzyl-p-cresoxymethyl)imidazoline, B. P. 206–209° at 2.5 mm.

EXAMPLE 116

2-(p-chloro-o-benzylphenoxymethyl)imidazoline

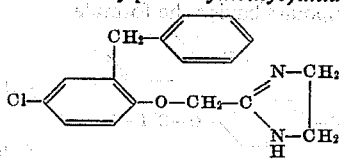

A mixture of 47.0 grams (0.154 mole) of ethyl p-chloro-o-benzylphenoxyacetate and 37 grams (0.615 mole) of anhydrous ethylenediamine is heated for 40 hours on a steam bath in a sealed pressure bottle. Distillation of the reaction mixture gives 32.3 grams of 2-(p-chloro-o-benzylphenoxymethyl)imidazoline, B. P. 207–213° at 2 mm.

EXAMPLE 117

2-[o-(p'-chlorobenzyl)phenoxymethyl]imidazoline

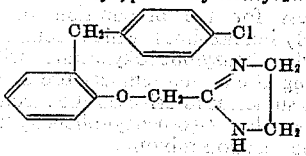

A mixture of 48.1 grams (0.158 mole) of ethyl o-(p'-chlorobenzyl)phenoxyacetate and 28.4 grams (0.474 mole) of anhydrous ethylenediamine is heated for 24 hours on a steam bath in a pressure bottle. Distillation of the reaction mixture gives 37.4 grams of 2-[o-(p'-chlorobenzyl)phenoxymethyl]imidazoline, B. P. 218–219° at 2 mm. The imidazoline may be recrystallized from petroleum ether; M. P. 116.0–117.5°.

Analysis: Calculated for $C_{17}H_{17}OClN_2$:

|   | Calculated | Found |
|---|---|---|
| C | 67.9 | 67.8 |
| H | 5.7 | 5.7 |

EXAMPLE 118

2-[o-(p'-fluorobenzyl)phenoxymethyl]imidazoline

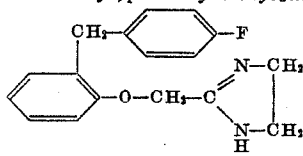

A mixture of 43.0 grams of ethyl o-(p'-fluorobenzyl)-phenoxyacetate and 27 grams (0.45 mole) of anhydrous ethylenediamine is heated for 40 hours on a steam bath in a sealed pressure bottle. Distillation of the reaction mixture gives 30.2 grams of 2-[o-(p'-fluorobenzyl)phenoxymethyl]imidazoline, B. P. 209–212° at 3 mm. The imidazoline may be recrystallized from cyclohexane; M. P. 104.5–106.5°.

Analysis: Calculated for $C_{17}H_{17}ON_2F$:

|   | Calculated | Found |
|---|---|---|
| C | 71.8 | 71.9 |
| H | 6.0 | 6.0 |

EXAMPLE 119

2-(o-benzylphenoxymethyl)imidazoline hydrochloride

Dry hydrogen chloride is passed into a cold solution of 33.1 grams of 2-(o-benzylphenoxymethyl)imidazoline in 350 ml. of ether and 50 ml. of benzene until an excess of hydrogen chloride is present. The solid imidazoline hydrochloride is collected by filtration and recrystallized from isopropyl alcohol. There is obtained 24.7 grams of pure hydrochloride, M. P. 183.0–185.0°.

Analysis: Calculated for $C_{17}H_{18}ON_2 \cdot HCl$:

|   | Calculated | Found |
|---|---|---|
| C | 67.4 | 67.4 |
| H | 6.3 | 6.4 |

EXAMPLE 120

2-(o-benzyl-p-cresoxymethyl)imidazoline hydrochloride

Dry hydrogen chloride is passed into a cold solution of 32.3 grams of 2-(o-benzyl-p-cresoxymethyl)imidazoline in 200 ml. of ether and 100 ml. of benzene until an excess of hydrogen chloride is present. The solid imidazoline hydrochloride is collected by filtration and recrystallized from isopropyl alcohol. There is obtained 20.1 grams of pure hydrochloride, M. P. 201.0–204.0°

Analysis: Calculated for $C_{18}H_{20}ON_2 \cdot HCl$:

|   | Calculated | Found |
|---|---|---|
| C | 68.2 | 68.0 |
| H | 6.7 | 6.8 |

EXAMPLE 121

2-(p-chloro-o-benzylphenoxymethyl)-imidazoline hydrochloride

Dry hydrogen chloride is passed into a cold solution of 32.3 grams of 2-(p-chloro-o-benzylphenoxymethyl)-imidazoline in 350 ml. of ether until an excess of hydrogen chloride is present. The solid imidazoline hydrochloride is collected by filtration and recrystallized from isopropyl alcohol-ether. There is obtained 18.8 grams of pure hydrochloride, M. P. 223.0–228.0°.

Analysis: Calculated for $C_{17}H_{17}ON_2Cl \cdot HCl$:

|   | Calculated | Found |
|---|---|---|
| C | 60.5 | 60.6 |
| H | 5.4 | 5.6 |

EXAMPLE 122

2-[o-(p'-chlorobenzyl)phenoxymethyl]-imidazoline hydrochloride

Dry hydrogen chloride is passed into a cold solution of 28 grams of 2-[o-(p'-chlorobenzyl)phenoxymethyl]imidazoline in 350 ml. of ether until an excess of hydrogen chloride is present. The solid imidazoline hydrochloride is collected by filtration and recrystallized from isopropyl alcohol. There is obtained 22 g. of pure hydrochloride, M. P. 239.5–243.5°.

Analysis: Calculated for $C_{17}H_{17}ON_2Cl \cdot HCl$:

|   | Calculated | Found |
|---|---|---|
| C | 60.5 | 60.2 |
| H | 5.4 | 5.5 |

EXAMPLE 123

*2-[o-(p'-fluorobenzyl)phenoxymethyl]-imidazoline hydrochloride*

Dry hydrogen chloride is passed into a cold solution of 29.2 g. of 2-[o-(p'-fluorobenzyl)phenoxymethyl]imidazoline in 200 ml. of ether and 100 ml. of benzene until an excess of hydrogen chloride is present. The solid imidazoline hydrochloride is collected by filtration and recrystallized from isopropyl alcohol. There is obtained 22.8 g. of pure hydrochloride, M. P. 203.0–206.0°.

Analysis: Calculated for $C_{17}H_{17}ON_2F \cdot HCl$:

|  | Calculated | Found |
|---|---|---|
| C | 63.7 | 63.6 |
| H | 5.7 | 5.8 |

We claim:

1. A new class of compounds consisting of the free base, its acid addition salts and its quaternary salts, said free base having the general formula $$(R_4)_n-Y-R_2-A(R_1)_m-O-R_3-Z$$

wherein $R_1$ and $R_4$ are members of the group consisting of hydrogen, lower alkyl, lower alkoxy, di(lower)alkylamino, halogen and lower cycloalkyl; $n$ and $m$ are integers from one to two inclusive; Y is a member of the group consisting of phenyl, pyridyl, thenyl and furyl; $R_2$ is a member of the group consisting of bivalent saturated and unsaturated hydrocarbon radicals containing from one to three carbon atoms inclusive; A is a member of the group consisting of benzene, naphthalene and quinoline; $R_3$ is a member of the group consisting of bivalent, saturated hydrocarbon radicals containing from one to six carbon atoms inclusive and Z is a member of the group consisting of piperidino, morpholino, N'(lower alkyl)-substituted-piperazino, pyrrolidino, cycloalkylamino, pipecolino, lower alkylamino, di(lower)alkylamino, and the following radicals:

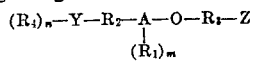

and

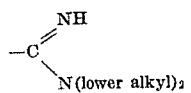

2. A non-toxic salt of the compound having the formula

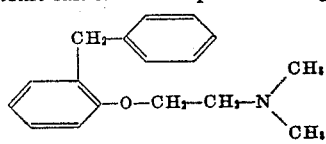

3. A non-toxic salt of the compound having the formula

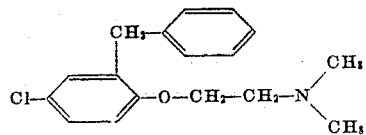

4. 2-benzylphenyl β-dimethylaminoethyl ether dihydrogen citrate.

5. The hydrochloride of the compound having the formula

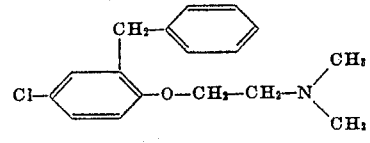

6. The compound having the formula

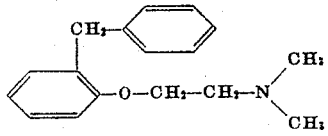

7. The compound having the formula

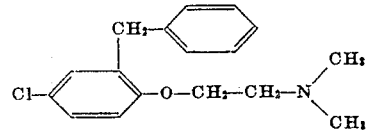

8. The compound having the formula

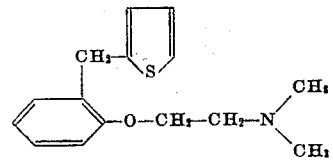

9. A process for the preparation of 2-(o-benzylphenoxymethyl)-imidazolines which comprises reacting a lower alkyl o-benzylphenoxyacetate with ethylenediamine, heating at elevated temperature and under pressure for a time sufficient to drive off the alcohol and water and recovering the 2-(o-benzyl-phenoxymethyl)imidazoline from the reaction mixture.

References Cited in the file of this patent

UNITED STATES PATENTS 1,894,865    Hartmann et al. ........... Jan. 17, 1933